US005526256A

United States Patent [19]

Sakata et al.

[11] Patent Number: 5,526,256

[45] Date of Patent: Jun. 11, 1996

[54] PASSENGER CONVEYER CONTROL APPARATUS

[75] Inventors: Kazuhiro Sakata; Hisao Chiba, both of Katsuta; Kazuhira Ojima, Kasama, all of Japan

[73] Assignee: Hitachi, Ltd., Tokyo, Japan

[21] Appl. No.: 327,817

[22] Filed: Oct. 17, 1994

Related U.S. Application Data

[63] Continuation of Ser. No. 162,974, Dec. 8, 1993, abandoned, which is a continuation of Ser. No. 661,196, Feb. 27, 1991, abandoned.

[30] Foreign Application Priority Data

Mar. 2, 1990 [JP] Japan .................................... 2-49310

[51] Int. Cl.[6] ................................................. G05B 9/02

[52] U.S. Cl. .......................... 364/184; 364/187; 198/323

[58] Field of Search .................................... 364/184, 187, 364/185; 371/68.3; 198/322, 323, 810, 330; 187/130, 133; 318/274

[56] References Cited

U.S. PATENT DOCUMENTS

| | | | |
|---|---|---|---|
| 4,118,792 | 10/1978 | Struger et al. | 364/184 |
| 4,350,225 | 1/1980 | Sakata et al. | 187/29 R |
| 4,358,825 | 11/1982 | McDonald et al. | 371/68.3 |
| 4,590,549 | 5/1986 | Burrage et al. | 371/68.3 |
| 4,600,865 | 7/1986 | Caputo | 318/274 |
| 4,628,508 | 12/1986 | Suger et al. | 364/187 |
| 4,718,389 | 1/1988 | Honig et al. | 364/187 |
| 4,823,914 | 4/1989 | McKinney et al. | 187/133 |
| 5,083,653 | 1/1992 | Sakata et al. | 198/322 |
| 5,099,977 | 3/1992 | Hiruse et al. | 198/323 |

FOREIGN PATENT DOCUMENTS

| | | |
|---|---|---|
| 91101377 | 3/1991 | China . |
| 55-11402 | 1/1980 | Japan . |

*Primary Examiner*—James P. Trammell
*Attorney, Agent, or Firm*—Antonelli, Terry, Stout & Kraus

[57] ABSTRACT

A passenger conveyer control apparatus includes various kinds of safety devices including a skirt guard switch, a terminal inlet switch, a chain safety switch and first and second microcomputers. The first microcomputer executes sequence processing corresponding to the operation of an escalator by the detection of an actuation of any of the safety devices, such as the start and stop of the escalator on the turn-on and off of the switches. The result of the processing is used for driving the escalator through driving means via an output memory. The second microcomputer executes processing by detecting the actuation of any safety device by the input signals from the safety device, whereupon a running permissive signal is outputted from an output terminal and executes processing for judging the operating situations of the safety devices of the escalator, and whereupon the judged results are communicated via a telephone interface and a public circuit to a centralized monitoring office which is in charge of maintenance.

17 Claims, 14 Drawing Sheets

PASSENGER CONVEYER CONTROL APPARATUS

This application is a continuation of Ser. No. 08/162,974filed Dec. 8, 1993, now abandoned which is a continuation of Ser. No. 07/661,196 filed Feb. 27, 1991, now abandoned.

BACKGROUND OF THE INVENTION

The present invention relates to a passenger conveyor control apparatus such that the operating situations of various kinds of safety devices in the passenger conveyor can be employed without comprising the safety of passengers, and can communicate or send information on the actuation of any of the safety devices to a remote centralized monitoring office.

A passenger conveyor, such as escalator or motordriven road, is equipped with various kinds of safety devices including a skirt guard switch, a terminal inlet switch and a chain safety switch. These safety devices are explained in the Japanese Laid-open Patent Publication No. 55-11402/1980 entitled "Passenger Conveyor Safety Apparatus", and also a method for detecting if any of the safety devices has been actuated is explained in detail.

Additionally, a technique is disclosed in the Japanese Laid-open Patent Publication No. 53-61889/1978 entitled "Safety Apparatus for Man Conveyor".

Disclosed in this publication is a system which has the object of reliably stopping the passenger conveyor and ensuring the safety of passengers when any of the safety devices has been actuated; the current of the coil of an electromagnetic switch for driving an electric motor is directly cut off to stop the passenger conveyor by the actuation of the safety device in an arrangement in which the normally-closed contacts of the various safety devices are connected in series with the coil; and which the various safety devices having been actuated is known by the actuation of the safety device from a relay having a self-holding circuit which is turned "on" by the normally-open contact of the actuated safety device of the automatic reset type.

Since, however, the normally-closed contacts of the safety devices are connected in series; this system has the disadvantage that the actuated safety device cannot be identified in a case where two of the safety devices have been simultaneously actuated, such a case of a momentary actuation state where the normally-closed contact has opened, but the normally-open contact has not closed, that is, where the electromagnetic switch has been turned "off" to stop the passenger conveyor, but the self-holding relay cannot self-hold, or a case where the normally-closed contact has bounded and separated due to, for example, the vibrations of a machine constructing, so that only the current of the coil of the electromagnetic switch has been cut off to stop the passenger conveyor.

Therefore, the former technique in the Japanese Laid-open Patent Publication No. 55-11402/1980 adopts a construction wherein the signals of the various safety devices are input to a microcomputer, which is one of digital electronic computers, in parallel, thereby making it possible to distinctively detect even the simultaneous actuations of the safety devices, and wherein the momentary actuation attributally, for example, the mechanical vibrations is not acknowledged as the actuation of the safety device, thereby to prevent the wasteful stops of the passenger conveyor. A disadvantage of this construction, however, is that, when the microcomputer has broken down, the detection of the actuation of any safety device is not fulfilled, so that the escalator cannot be stopped so that the safety devices which has been actuated is not known at the breakdown of the microcomputer, and so on.

Besides it has recently been recognized that a system having a safety device of a manual reset type in which an expert repair person stationed at a centralized monitoring office in a remote place is automatically called out by using a public circuit or the like, is required to resume the safety device promptly.

A similar technique is practised in elevators. This technique has an object to quickly rescue passengers when they have been trapped in the cage of the elevator, and this object differs from that of the technique of the passenger conveyor. More specifically, even when the passenger conveyor has stopped, no person is confined therein, in contrast to the case of the elevator. Since, however, the passenger conveyor is used at a traffic facilities; the prompt resumption is intended as described above.

By the way, examples of such techniques in elevators are "Apparatus for Automatically Reporting Trouble of Elevator" in the Japanese Laid-open Patent Publication No. 48-18942/1973 and "Emergency Reporting Apparatus" in the Japanese Laid-open Patent Publication No. 61-169464/1986.

In a case where, using the prior-art techniques, priority is given to reliably stopping the passenger conveyor upon the actuation of any safety device; the normally-closed contacts of the various safety devices and the coil of the electromagnetic switch may be connected in series. Using this technique, however, there arises the disadvantage that the exact operating situations of the individual safety devices cannot be known.

On the other hand, with the construction wherein the exact operating situations of the individual safety devices are known and wherein priority is given to avoiding the stops caused by trial actuations, the signals of the contacts of the safety devices may be respectively input to the microcomputer. In this case, however, there arise the problem that, when the microcomputer has broken down, the passenger conveyor becomes unsafe because it cannot be stopped by the actuation of any safety device, and the problem arises that the actuated safety device cannot be specified.

Incidentally, when stopping the passenger conveyor such that the breakdown of the microcomputer is detected by a breakdown detector, for example, a so-called watchdog timer, the passenger conveyor is stopped irrespective of the actuation of any safety device, and hence, the passengers will be kept safe. Since, however, the passenger conveyor is a vehicle which is run in a horizontal direction or in a slant direction while carrying the persons thereon, the sudden stop may possibly hurt the passengers due to a falling-dominoes effect. Especially, when the escalator stops during the running down thereof, the possibility is very high of the falling-dominoes effect. Accordingly, the passenger conveyor is inevitably stopped by the actuation of any of emergency devices such as the safety devices for protecting the passengers, but the another stop thereof due to the breakdown of the microcomputer must be avoided.

Also, there is the problem that, when any of the manual type safety devices has been actuated, the actuation is to be immediately communicated (sent as a message) to the repair person stationed at the centralized monitoring office in the remote place, so as to repair the safety device promptly.

SUMMARY OF THE INVENTION

An object of the present invention is to provide a control apparatus for a passenger conveyor in which the passenger conveyor can be reliably stopped upon the actuation of any of the safety devices.

Besides, it is another object of the present invention to provide a control apparatus for a passenger conveyor in which the operating situations of safety devices can be reliably known.

Further, it is another object of the present invention to provide a control apparatus for a passenger conveyor in which the passenger conveyor can be operated without being stopped even in case of the breakdown of a microcomputer that is a digital electronic computer constituting the control apparatus, and in which the passenger conveyor can be reliably stopped upon the actuation of any safety devices.

In addition, it is another object of the present invention to provide a control apparatus for a passenger conveyor in which, when any safety devices have been actuated, the actuation can be communicated.

A feature of the present invention for accomplishing the above objects consists in a construction in which a plurality of digital electronic computers for controlling the passenger conveyor are disposed in parallel and are respectively supplied with the signals of the same safety devices; the individual electronic computers detect the actuation of any of the safety devices in accordance with the same programs, and the passenger conveyor can be stopped on the basis of the detection of the actuation.

Another feature of the present invention consists in that each of the electronic computers is furnished with means for detecting the breakdown of the electronic computer, and means for invalidating an output for stopping the passenger conveyor based on the detection of the actuation by the corresponding electronic computer, when the detection means has detected the breakdown.

Further, another feature of the present invention consists in that, among the plurality of electronic computer, one which is chiefly used for a running control is furnished with means for detecting the breakdown of the corresponding electronic computer, and output storage means for maintaining, when the breakdown detection means has detected the breakdown, the output state of the corresponding electronic computer at the time of the detection without change.

Further, another feature of the present invention consists in that, among the plurality of electronic computers, any two are furnished with breakdown detection means and are supplied with the control signals of the passenger conveyor, thereby to perform the running control of the passenger conveyor, respectively and that the passenger conveyor is run by a construction in which the output results of the electronic computers are reflected upon drive means for a driving machine via change-over means capable of changing-over from one of the electronic computers to the other when the breakdown detection means has detected a breakdown.

Further, another feature of the present invention consists in that, among the plurality of electronic computers, any two are furnished with breakdown detection means and are supplied with the control signals of the passenger conveyor, thereby to perform the running control of the passenger conveyor, respectively, that the output results of the respective electronic computers are input to comparison means and are transmitted to the drive means for a driving machine from the output storage means for storing the outputs of the comparison means. When the breakdown detection means has detected the breakdown, the passenger conveyor is run by means for invalidating output signals from the electronic computer breakdown whose has been detected.

Further, another feature of the present invention consists in that, among the plurality of electronic computers, one is employed for controlling the communications with a centralized monitoring office.

Further, another feature of the present invention consists in that a message is communicated on the basis of the actuation of any of manual reset type safety devices.

Further, another feature of the present invention consists in that each of the plurality of electronic computers is furnished with means for remedying the breakdown of the electronic computer.

Further, another feature of the present invention consists in that, when the electronic computer having the output storage means has had its breakdown remedied by the breakdown remedying means of any of the other electronic computers, it can operate continuously on the basis of signals stored in the output storage means.

In case of the actuation of any of the safety devices, the actuation signal is input to all of the plurality of digital electronic computers. Therefore, even when any are of the electronic computers have broken down, another detects the actuation of the safety device and produces the result of the detection thereof. Accordingly, the passenger conveyor can be stopped through the drive means for the driving machine, and the passengers are liberated from a dangerous situation having been formed by the cause of the actuation of the safety device. Incidentally, since a microcomputer which is one form of the digital electronic computers can be used with ease, the system can be readily constructed using, for example, an electronic computer for input/output control and also for the detection of the actuation of the safety device.

Even when the electronic computer has been broken down and has produced an erroneous detection output despite the non-actuation of the safety device, the breakdown detection means detects the breakdown and invalidates the erroneous output. Therefore, the passenger conveyor is not erroneously stopped, and the passengers do not fall down one upon another.

Further, the digital electronic computer maintains its control signals for the drive means as they were, for a predetermined time period since the breakdown. Therefore, when the breakdown has been detected by the breakdown detection means, the outputs of the electronic computer are maintained at the time of the breakdown by the output storage means before the outputs or control signals are changed. Since the passenger conveyor is kept operating until the breakdown, the operating state is maintained irrespective of the breakdown of the electronic computer. Accordingly, the passenger conveyor is not stopped, so that the passengers are not injured or inconvenienced as in the foregoing previous described !!!!!!!!!!!!!!!!!!!!!!!!.

Further, among the plurality of digital electronic computers, any two of the digital electronic computers are furnished with the breakdown detection means and are respectively supplied with the control signals for the passenger conveyor, so that the results of the input signals should be identical outputs. The output signals of one of the two electronic computers are usually employed, and these output signals are changed-over to those of the other normal electronic computer when the former electronic computer has broken down, so that the passenger conveyor can be run safely.

Further, among the plurality of digital electronic computers, any two of the digital electronic computers are furnished with the breakdown detection means and are respectively supplied with the control signals for the passenger conveyor, so that the results of the input signals should be identical outputs. The output signals of one of the two electronic computers are usually employed, and these output signals are changed-over to those of the other normal electronic computer when the former electronic computer has broken down, so that the passenger conveyor can be run safely.

Further, among the plurality of digital electronic computers, any two are furnished with the breakdown detection means and are respectively supplied with the control signals for the passenger conveyor, so that the results of the input signals ought to become identical. When the passenger conveyor is controlled on the basis of the identical signals, it can be controlled safely. More specifically, even when the output signal of either electronic computer indicates the actuation of the safety device or when either electronic computer breaks down and fails to detect the actuation of the safety device, the output signals of both the electronic computers are not identical, so that the passenger conveyor can be stopped as a result of the non-identical signals. Besides, when either electronic computer has broken down, the breakdown is detected, and the output from this electronic computer is invalidated, so that the passenger conveyor is not stopped by the breakdown. To this end, the output from the electronic computer is delayed for a period of time for detecting the breakdown.

Further, in performing the communication control in consequence of the detection of the actuation of any safety device, the communication is performed upon the actuation of any manual reset type safety device, so that the repair person can be dispatched effectively without wasteful communication.

Further, the electronic computer furnished with the breakdown detection means is immediately restored by the means for restoring the electronic computer having broken down, upon the detection of the breakdown, so that the operating situations of the safety devices can be detected. Therefore, the passenger conveyor can be utilized safely at all times.

Further, the digital electronic computer is supplied with the signals of the output storage means storing the output signals of the computer at the time of the breakdown thereof in order that the computer may continue the control after the restoration thereof from the breakdown. Therefore, the passenger conveyor may be controlled on the basis of these signals.

BRIEF DESCRIPTION OF THE PREFERRED EMBODIMENT

Now, an embodiment of the present invention will be described in detail with reference to the drawings.

Figure 1:
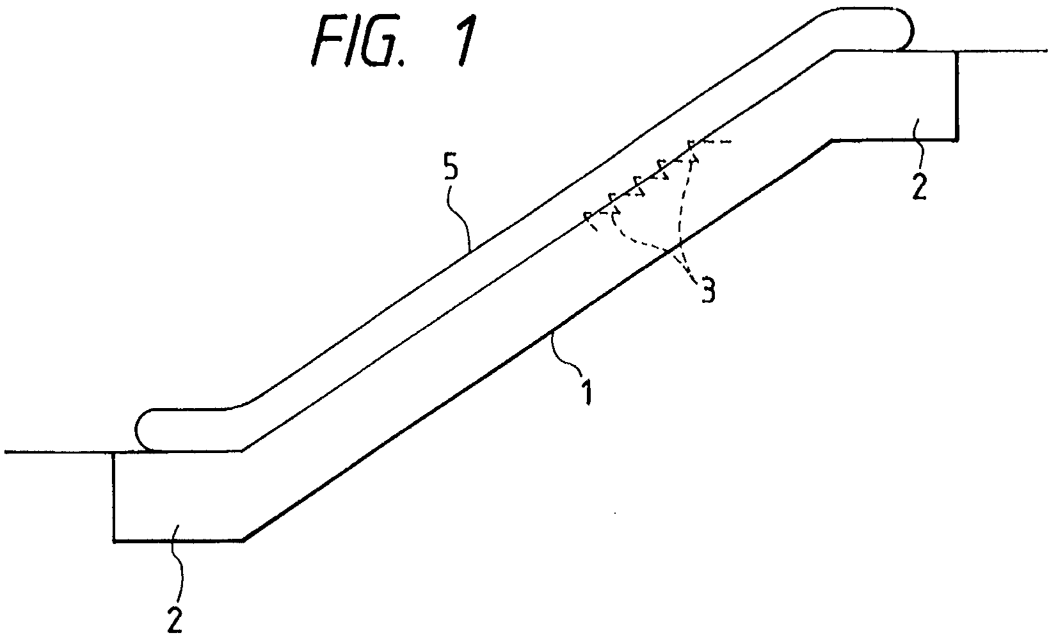
FIG. 1 is a schematic side view of an escalator in accordance with the present invention.

FIG. 1 shows the side surface of the general construction of a passenger conveyor, particularly one having a slope in its travel, namely, an escalator to which the present invention is applied.

The escalator is so constructed that frame 1 supports the whole equipment as shown in FIG. 1, such that a driving sprocket and a driven sprocket (not shown) are respectively installed in machinery rooms 2 inside the upper and lower parts of the frame, such that an endless footstep chain is wound round the sprockets, and such that a large number of steps 3 are mounted in the form of a train and unitarily with the chain.

All the steps 3 are moved up or down in such a way that a driving machine (not shown) drives the driving sprocket. In addition, handrails 5 which are driven at the same speed as that of the steps 3 are moved on balusters which are disposed on both the sides of the steps 3.

By the way, various kinds of safety devices for an escalator, the operations thereof, for example, are explained in detail in the Japanese Laid-open Patent Publication No. 55-11402/1980 as mentioned before, and they shall be omitted from description for the sake of brevity.

Incidentally, in the above official gazette laid open, one of the automatic reset type among the safety devices is defined "a safety switch which serves to prevent passengers from being entangled in the escalator". On the other hand, a safety device of the manual reset type is introduced as "a safety switch which stops the escalator as soon as a machine constituent has developed trouble, thereby to keep passengers safe". For example, an inlet switch is the automatic reset type safety device because it is reset by the removal of a fault corresponding thereto. In addition, a speed governor switch is the manual reset type safety device which cannot be reset unless a cause of the fault has been cleared up by a repair person.

Besides, a start switch panel which is equipped with switches for starting and stopping the escalator, an emergency stop switch for stopping the escalator in emergency, for example are disposed at the terminal portion of the escalator.

Figure 2:
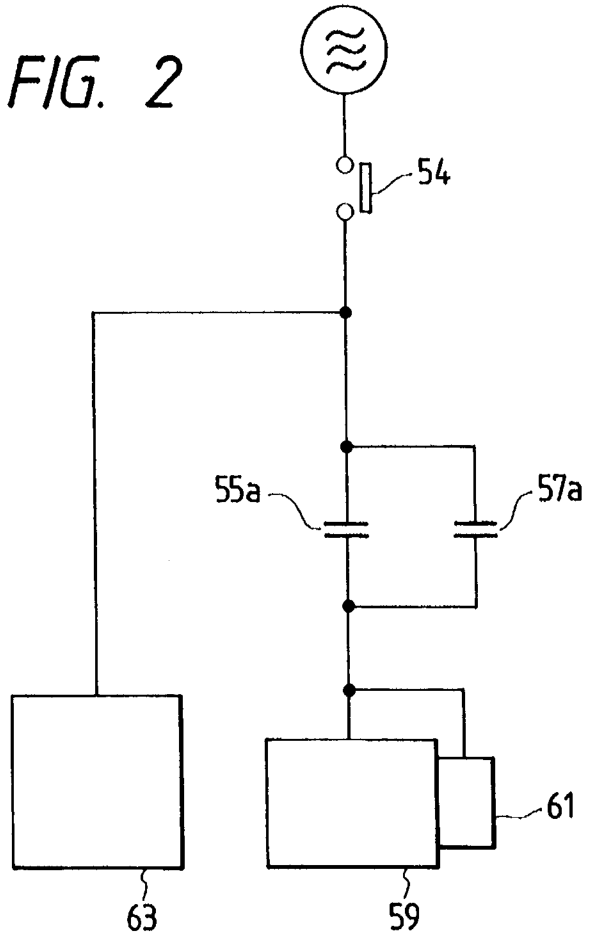
FIG. 2 is a block diagram showing the general arrangement of a control circuit in one embodiment of the present invention.

FIG. 2 is a block diagram showing the general arrangement of a control apparatus for the passenger conveyor according to the present invention.

Referring to FIG. 2, the control apparatus is so constructed such that a supply voltage is fed from a three-phase power source for feeding power to the whole control apparatus, to an electric motor 59 for driving the driving machine of the passenger conveyor or escalator, as well as a brake gear 61, via a circuit breaker 54 and the respective contacts 55*a*, 57*a* of electromagnetic switches for up and for down 55, 57 to be described later.

With the control apparatus, when the electromagnetic switch 55 to operate this conveyor is on up direction, for example, is energized to close its contact 55*a*, the brake geare 61 is taken off to rotate the motor 59, and the rotation is transmitted to the driving machine, by which an endless belt and the steps 3 corresponding to the endless belt are moved upwards, thereby running the escalator. 0n the other hand, in a case where the electromagnetic switch 57 operating the escalator in a down direction is energized, the escalator is run downwards.

Further, the control apparatus is so constructed that a logic control section 63 which includes microcomputers being electronic computers, for example, is fed with the three-phase power source voltage through the circuit breaker 54.

Figure 3:
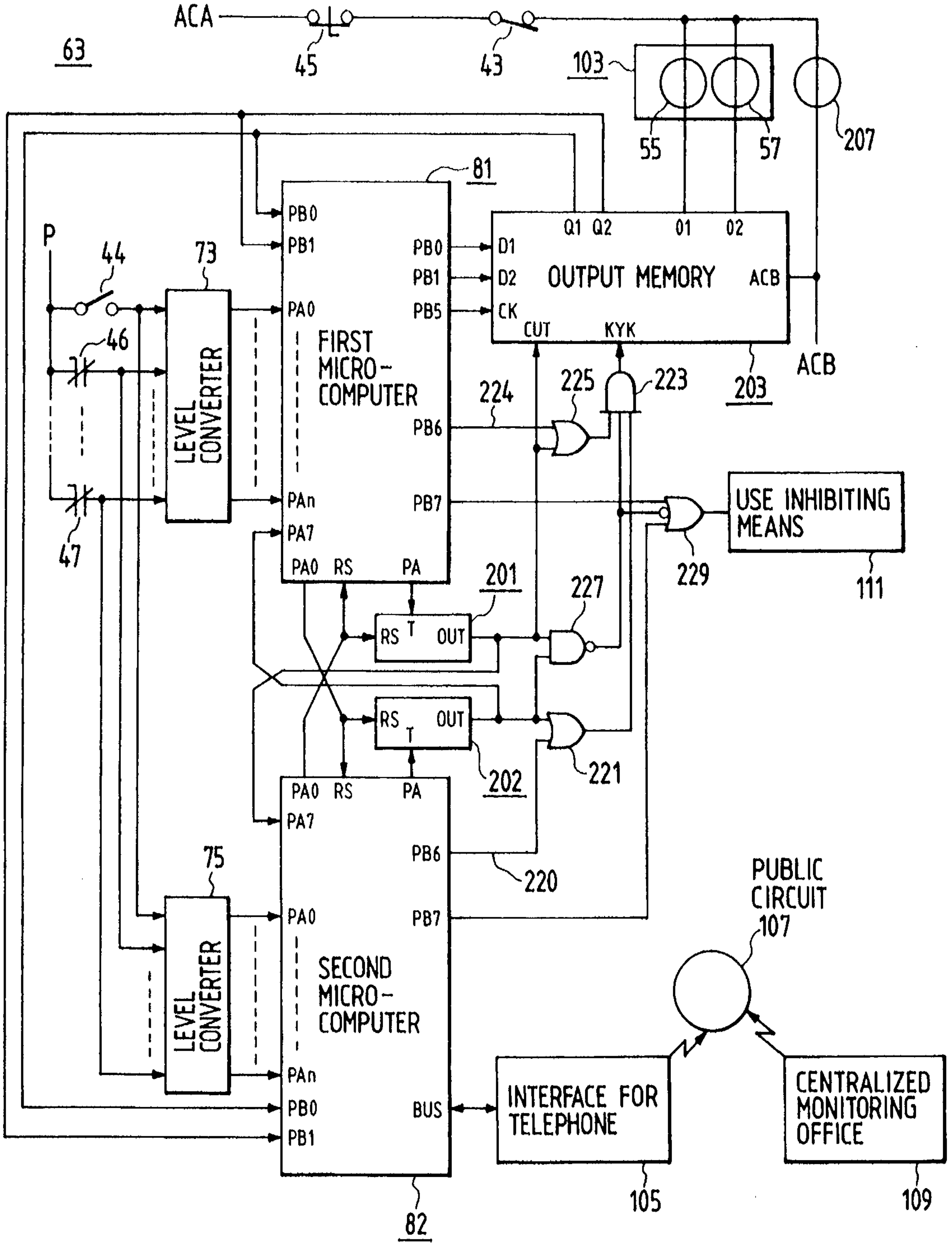
FIG. 3 is a detailed block diagram of a logic control section according to the first embodiment of the present invention.

FIG. 3 is a detailed block diagram showing the logic control section 63, which will now be described.

The logic control section 63 is constructed having as its core, a microcomputer 81 which is the first digital electronic computer and a microcomputer 82 which is the second digital electronic computer. Although the microcomputers 81 and 82 are separately illustrated, they may well be two, completely independent microcomputers which are integrated within a single semiconductor chip.

The first microcomputer 81 principally executes sequence processing concerned with the running control of the escalator containing the detection of the actuation of any safety device, such as the start and stop of the escalator in response to the turn-on and turn-off of switches 44, 46 and 47. The results of the processing are used for driving the escalator through drive means 103 for the driving machine, via an output memory 203 being output storage means to be described in detail with reference to FIG. 4. By the way, in this embodiment, the drive means 103 is constructed including the electromagnetic switches for up and for down 55, 57, respectively. Accordingly, when the electromagnetic switch 55 or 57 is closed to turn "on" the corresponding contact 55*a* or 57*a*, the brake gear 61 is taken off, and the motor 59 starts rotating as shown in FIG. 3, whereby the driving machine of the escalator is driven.

On the other hand, the second microcomputer 82 executes processing in which the actuation of any safety device is detected on the basis of the input signals of the safety devices to be described later, whereupon a running permissive signal 220 is output from an output terminal PB6 as the result of the detection of the actuation. Besides, it executes processing in which the operating situations of the safety devices of the escalator are judged, whereupon the judged results are communicated (sent as messages) via n interface for telephone 105 and a public circuit 107 to a centralized monitoring office 109 which is in charge of maintenance.

In the ensuring description, for the sake of brevity, the input and output terminals of the microcomputers 81, 82, for example, shall be expressed merely as inputs and outputs with the word "terminals" omitted.

The embodiment will be described in more detail below.

The first and second microcomputers 81, 82 are constructed of the same hardware. In addition, they execute the detection of the actuation of any safety device with the same programs. The microcomputers 81, 82 differ only in how to use the inputs/outputs thereof, the point that, in order to drive the telephonic interface 105 from the microcomputer 82, the address bus and data bus of microcomputer 82 are laid from the terminal BUS thereof.

Of course, the application programs of the microcomputers differ because the processing contents of software are partly different.

Regarding the individual microcomputers 81, 82 stated above, devices of HMCS-6800 Family manufactured by Hitachi, Ltd. are employed. Since a breakdown detector 201 (202) is equivalent to one explained in detail in the Japanese Patent Publication Laid-open No. 55-106976/1980 entitled "Elevator Control Apparatus" they shall be omitted from description here. Incidentally, in this embodiment, the breakdown detector is constructed of a so-called "watchdog timer".

Among input signals to the microcomputers, control signals for controlling the escalator are produced by an up command switch, a down command switch, for example, which are included in the start switch panel mentioned before, and the start switch 44 is depicted in FIG. 1. In the ensuring description, it will be assumed that the start switch 44 is turned "on" when any of the command switches, for example, is manipulated. In the illustration, the opening or closure of the contact of a safety relay 207 is also included in the representative start switch 44.

Regarding the safety device signals which are output as the operating situations from the respective safety devices, the safety devices of the manual reset type are represented by the switch 46, while those of the automatic reset type are represented by the switch 47, and the numerals are assigned to the depicted switches.

The circuit element which produces the corresponding control signals and the safety device signals is connected to the power source P at one end thereof, while it is connected to a level converter 73 (for the microcomputer 81) and a level convert 75 (for the microcomputer 82) at the other end thereof.

The level converters 73, 75 convert voltages for external use into voltages for the microcomputers (in general, 5 V). Subsequently, the control signals and safety device signals having passed through the level converters 73, 75 are respectively applied to the inputs PAO to PAn of each of the first and second microcomputers 81, 82.

The reason why the two level converters 73, 75 are disposed for the respective microcomputers in this manner, is that, when a single level converter is employed and develops trouble, the signals of the manual reset type safety device 46, automatic reset type safety device 47, for example, fail to be inputted to the respective microcomputers, and that, considering this fact, the double loop arrangement is adopted so as to ensure the detection of the actuation.

The outputs of the microcomputer 81 include outputs PBO, 1, 5 for running the escalator. These outputs are respectively applied to the inputs D1, 2, CX of the output memory 203 at the succeeding stage so as to drive this output memory 203.

However, in a case where the breakdown detector 201 has detected the breakdown of the microcomputer 81, an output is applied from the output OUT of the breakdown detector 201 to the input CUT of the output memory 203, which will be described later, the signals from the microcomputer 81 are cut off, and the output memory 203 returns its storage without being driven. This invalidates the erroneous control signals for example, produced by the broken down microcomputer, thereby the prevent the output memory 203 from stopping the motor 59 by way of example.

The output PBO of the microcomputer 81 is a terminal which delivers a signal for running the escalator upwards. When, after the delivery of this signal based on the closure of the up command switch included in the start switch 44, the output PB5 of the microcomputer 81 is changed; the changed output signal is stored in the output memory 203. Further, an output 01 and output ACB are connected in response to this signal within the output memory 203. If a stop switch 43 and an emergency stop button 45 installed in the start switch panel of the escalator are "on" at this time, the electromagnetic switch for up 55 is closed. In accordance with this operation, the escalator begins running upwards.

Likewise, in case of the escalator running downwards, a signal is delivered from the output PB1 of the microcomputer 81 for the running downwards in consequence of the close of the down command switch included in the start switch 44, and further, the output PB5 is changed. Then, the changed output signal is stored in the output memory 203, in which an output 02 and the output ACB are connected, and the electromagnetic switch for down 57 is closed, so that the escalator begins downward.

In case of stopping the escalator, when the stop switch 43 is manipulated, a power source across terminals ACA–ACB is cut off. Therefore, the electromagnetic switches for up and for down 55, 57 and the safety relay 207 are released, and the motor 59 stops the drive. Besides, the brake gear 61 operates to apply breaking and to stop the escalator. Incidentally, the microcomputer 81 recognizes the stop command from the operation of the contact of the safety relay 207 as included in the start switch 44, and after bringing the output signal of the output PBO or PB1 back to a stop status, it changes the output PB5 so as to erase the storage in the output memory 203.

Besides, in case of stopping the escalator in an emergency during the running thereof, the aspect of operation is the same as based on the manipulation of the stop switch 43 as stated above. By the way, in a case where the manipulations of the stop switch 43 and emergency stop button 45 need to be discriminated, the escalator may be stopped by connecting the stop switch 43 to the inputs of the microcomputers similarly to the start switch 44. Thus, the occasion of the operation of the safety relay 207 can be discriminated from that of the operation of the stop switch 43. Incidentally, even when the switches 55, 57 are not cut off directly by the stop switch 43, the escalator can be reliably stopped by executing the stop processing by means of both the microcomputers 81, 82.

While the microcomputer 81 is processing the main operations as stated above and is running the escalator, the microcomputer 82 is executing the actuation detection processing on the basis of the inputs of the signals of the safety devices 46, 47.

When, as the result of the actuation detection processing, the microcomputer 82 has judged the operating situations of the safety devices to be normal, it delivers the running permissive signal 220 as an active signal "1" from the output PB6.

The running permissive signal 220 is constructed so that it is set to "1" by hardware simultaneously with the closure of the power source and can be controlled by software thenceforth. Owing to this relation, a similar effect can be attained even when the running permissive signal is replaced with a running non-permissive signal, and an inactive signal is output.

The running permissive signal 220 is passed through an OR gate 221 which is means for invalidating this running permissive signal 220, and it is applied to the input KYK of the output memory 203 via an AND gate 223.

Upon receiving the running permissive signal 220 at the input KYK, the output memory 203 stores an up or down command which is delivered from the microcomputer 81.

Meanwhile, the other input of the gate 221 which is the means for invalidating the running permissive signal 220 is connected to the output OUT of the breakdown detector 202 of the microcomputer 82. The output from the breakdown detector 202 is "0" while the breakdown is not detected, whereas it becomes "1" when the breakdown has been detected. In the case of the detection of the breakdown, accordingly, the breakdown detection output "1" of the breakdown detector 202 is preferentially delivered as the output of the gate 221 because the signal of the output OUT of the breakdown detector 202 is produced earlier than that of the output PB6 of the microcomputer 82, and the gate output is not affected by the signal change of the output PB6 of the microcomputer 82.

Such a construction is intended to prevent the escalator from being stopped on the basis of an erroneous signal from the broken down microcomputer, thereby to avoid an accident in which the passengers fall one upon another, for example.

A running permissive signal 224 is also delivered from the output PB6 of the other microcomputer 81, and as in the case of the microcomputer 82, the running permissive signal is input to the gate 223 through an OR gate 225 which is means for invalidating this permissive signal. Also, the output of the breakdown detector 201 is input to the gate 225.

In this manner, the running permissive signal 224 is constructed similarly to the running permissive signal 220 of the microcomputer 82 and operates in quite the same manner. Such a construction is intended to unify the hardware and the software in both the microcomputers. Incidentally, the microcomputer 81 can be programmed so as to stop the escalator by using the outputs PBO, 1, 5 directly without resorting to the running permissive signal.

An arrangement in which the outputs OUT of both the breakdown detectors 201, 202 are connected to the inputs of a NAND gate 227, is intended for the situation in which both the microcomputers have broken down. More specifically, when all the microcomputers have broken down, the escalator cannot be safely operated. Therefore, one input of the gate 223 is brought to "O" so as to bring the input KYK of the output memory 203 to "O", thereby to stop the escalator. Moreover, since the output of the NAND gate is also connected to a gate 229, a display,for example, can be presented to the users by using inhibiting means 111 so as to instruct the users not to get on the escalator. By the way, the use inhibiting means 111 is installed so as to present the display at only one inlet conforming to the running direction of the escalator, and at both inlets while the escalator is at a stop. Here in the description, such aspects are represented by the use inhibiting means 111.

Next, there will be explained the operation of means for recovering the microcomputer when it has broken down.

When the breakdown detector 201 or 202 has detected the breakdown of the corresponding microcomputer 81 or 82, the breakdown signal of the detector is applied from the output OUT thereof to the input PA7 of the other microcomputer 82 to 81. When the breakdown signal is applied to the input PA7, a signal for the recovery is delivered from the output PAO of the other microcomputer. The output signal is applied to the input RS of the breakdown detector 201 or 202, whereby this breakdown detector performs the reset operation of returning the breakdown detector into a state assumed before the detection of the breakdown. At the same time, the output signal is applied to the input RS of the other microcomputer. When the signal is applied to this RS, the microcomputer is initialized and reset in the same manner as in the case of the closure of the power source. Thereafter, it begins to operate in accordance with the predetermined program, and it is recovered, and operating resumes.

In a case where the microcomputer has not recovered due to the permanent breakdown of the hardware -,- unlike any temporary breakdown attributable to electrical noise or the like, the breakdown detector having been reset beforehand detects the breakdown again. Owing to this mode, when the other microcomputer has judged that the microcomputer is not recovered from the breakdown, it delivers an output signal from its output PB7 to the escalator by the use inhibiting means 111 via the OR gate 229. Incidentally, as the use inhibiting means 111, an indicated lamp unit which presents the display of "OUT OF ORDER" may well be installed at the inlet by way of example. Accordingly, even when the escalator is being run, the users do not get on because of the display. It is therefore possible to prevent the users from getting on the escalator, on account of the breakdown of the microcomputer; the actuation of any safety device cannot be detected by the two microcomputers, so the reliability of the detection is low. The fact that the escalator is not stopped at the time of the breakdown, take into consideration the accident in which the passengers fall one upon another due to the sudden stop.

Alternatively, an alarm buzzer may be sounded as the use inhibiting means 111. After a predetermined time since the sounding, the operation of inhibiting the running permissive signal and stopping the escalator is performed, whereby the escalator of the low reliability can be similarly inhibited from use.

In the case of the breakdown of the microcomputer 81, since this microcomputer chiefly executes the sequence processing relevant to the running control of the escalator, it is effective for preventing any accident attributable to the stop such that the escalator continues to run at the time of the breakdown, and the output memory 203 is provided also for this purpose. The microcomputer 81 can continue its operation after its recovery from the breakdown such that signals are applied from the outputs Q1, 2 of the output memory to the inputs PBO, 1 of this microcomputer. Steps for the continuation of the operation will be explained with reference to FIG. 6 later. Incidentally, the signals from the outputs Q!, 2 are also applied to the inputs PBO, 1 of the microcomputer 82, and they are used for judging whether or not a communication is required, after the detection of the actuation of the safety device.

Figure 4:
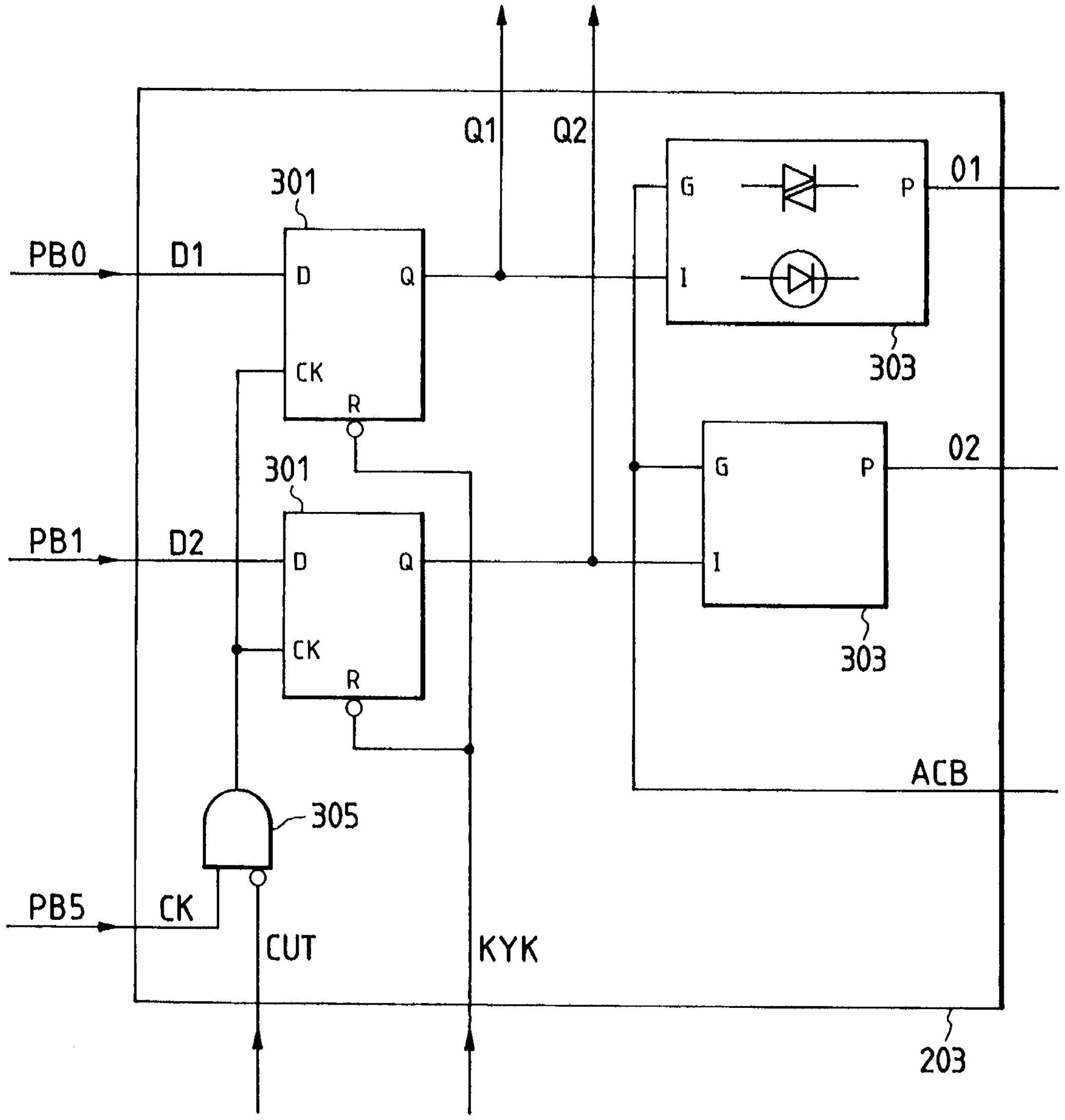
FIG. 4 is a detailed circuit diagram of an output memory according to the first embodiment of the present invention.

FIG. 4 is a detailed block diagram of the output memory 203 constructing the output storage means to which the outputs PBO, 1, 5 of the microcomputer 81, for example, are connected.

The output memory 203 is mainly configured of two flip-flops (FF's) 301 and two solid-state relays (SSR's) 303. The FF 301 stores a signal applied to its input D, when a clock signal applied to the clock CK of this FF changes as "O"→"1"→"O" while it delivers the stored result from its output Q. In addition, it is reset to deliver "O" from the output Q when its input R becomes "0". By the way, the inputs R's of the two FF's are connected, and the input R's are driven from outside through the input KYK of the output memory 203.

When the SSR 303 receives the signal of "1" at its input I, it turns "on" a built-in light emitting diode and ignites a built-in Triac with the light of the diode, to bring its outputs P and G into a conducting state and to permit the current of an A.C. power source to pass therethrough. Thus, a status in which the output Q1 is "1" with the output Q2 being "0" expresses the upward running of the escalator while a status in which the output Q2 is "1" with the output Q1 being "O" expresses the downward running of the escalator, and a status in which both the outputs Q1, Q2 and "O's" expresses the stopped state of the escalator. By the way, the outputs G's of the two SSR's 303 are connected to the terminal ACB which is connected to the A.C. power source. The other outputs P;s are externally led as the outputs 01, 02.

Besides, input CUT of the output memory 203 which is connected with the output OUT of the breakdown detector 201 and the input CK thereof which is connected with the output PB5 of the microcomputer 81 are related such that, when the signal of the input CUTR is "O", the signal of the input CK is delivered unchanged from a gate 305, whereas when the former signal is "1", the latter signal is blocked Further, the output of the gate 305 is applied to the inputs CK's of the FF's 301. Therefore, when the signal of the input CUT is "O" the signals of the inputs D1, 2 to the output memory 203 can be stored unchanged in the respective FF's 301, in accordance with the changes "O"→"1"→"O" of the signal of the inputs CK's. 0n the other hand, when the signal of the input CUT is "1" the signal of the input CK is blocked by the gate 305 and cannot change, so that the stored inputs of the FF's 301 are unchanged.

The outputs Q's of the FF's 301 are respectively connected to the inputs I of the SSR's 303, and they are respectively connected to the inputs PBO, 1 of the microcomputer 81 in order to deliver the signals of these outputs from the outputs Q1, 2 of the output memory 203 and to construct the means for continuing the operation of the microcomputer 81 at the recovery thereof from the breakdown.

Next, the concepts of the software will be described with reference to flow charts in FIG. 5 to FIG. 12.

Figure 5:
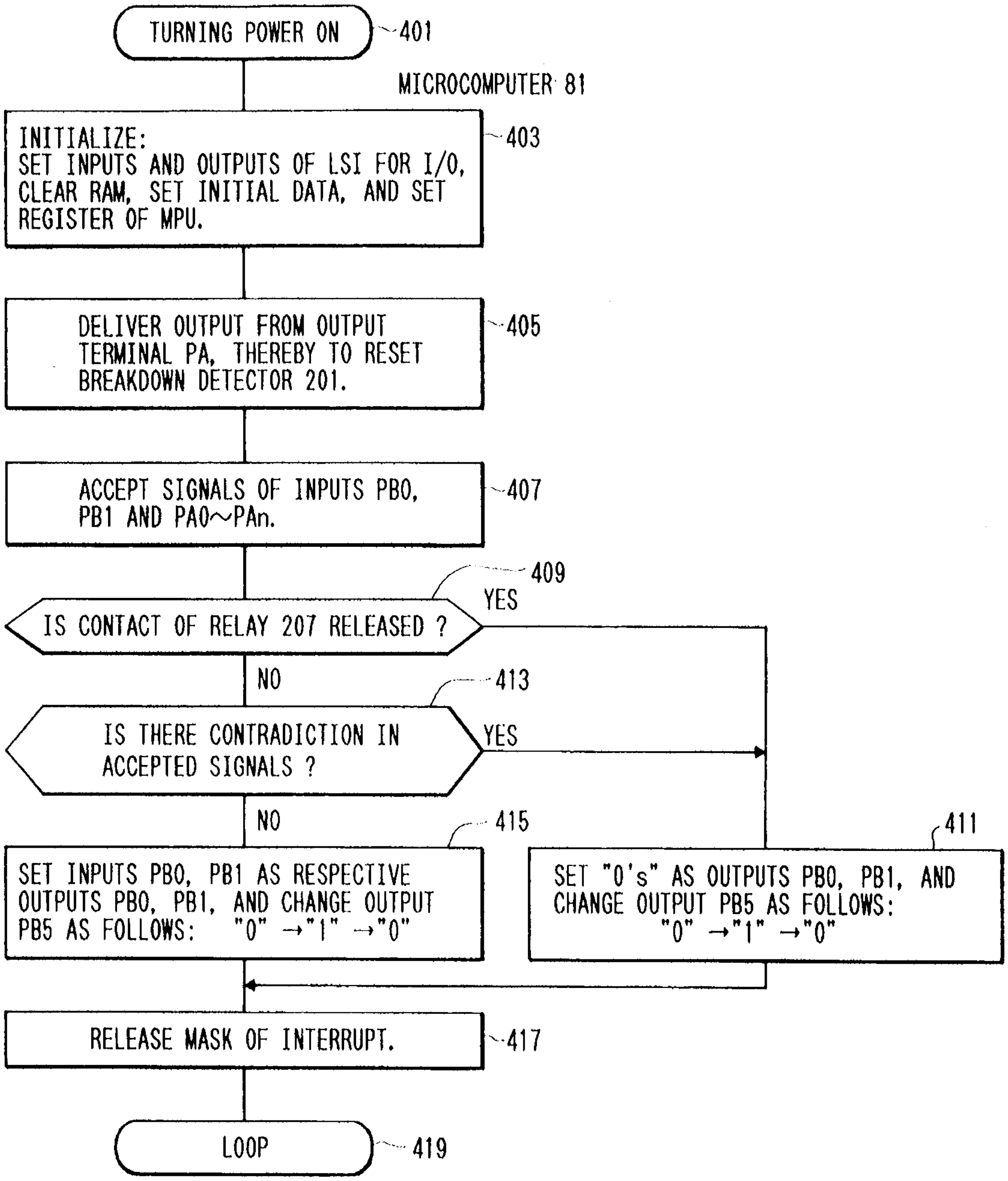
FIG. 5 is a schematic flow chart of a first microcomputer according to the first embodiment of the present invention.
Figure 6:
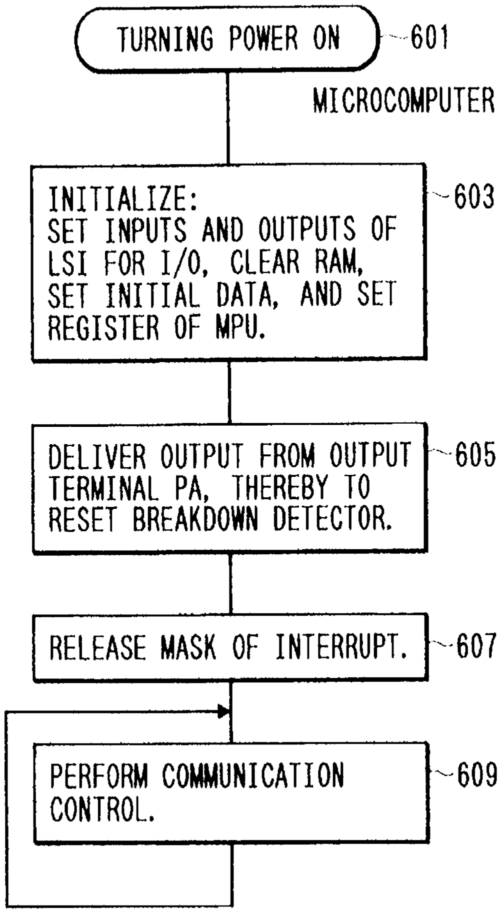
FIG. 6 is a schematic flow chart of a second microcomputer according to the present invention.

FIGS. 5 and 6 are the flow charts of controls which are first processed closing the power source and restarting the escalator by the first microcomputer 81 and the second microcomputer 82, respectively. In the processing, there are executed initializing registers, for example, relevant to the microcomputers clearing and initializing memories such as the breakdown storage, for example.

In FIG. 5 corresponding to the microcomputer 81, the processing of recovering the microcomputer 81 after the breakdown thereof is executed as described above. A terminal 419 signifies that the flow chart is not performed thenceforth.

In FIG. 6 corresponding to the microcomputer 82, the communication control processing of controlling the telephonic interface 105 and communicating, for example, trouble information to the centralized monitoring office 109 is also executed.

By the way, only a block 609 (communication control) in the figure is normally processed as a loop thenceforth.

Figure 11:
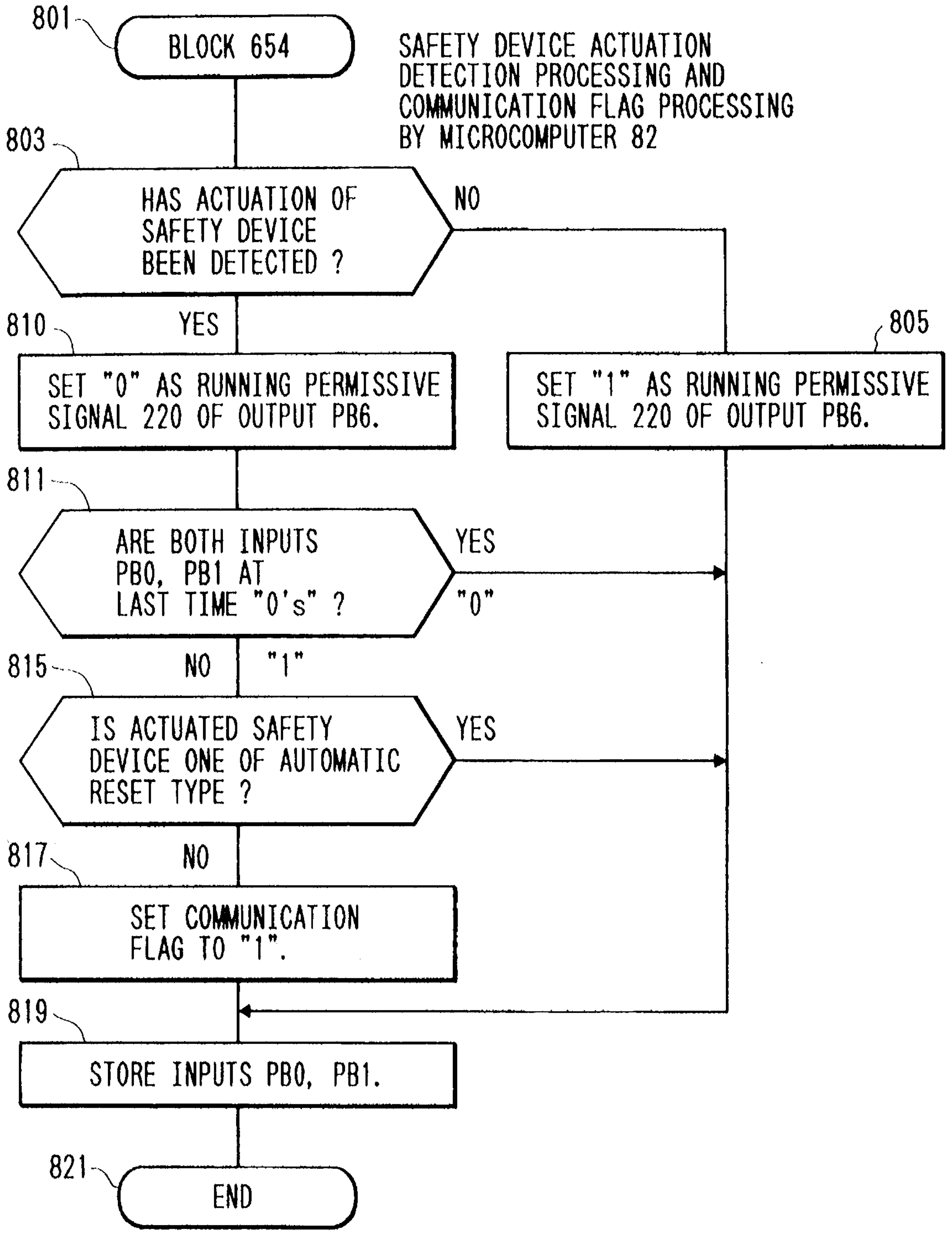
FIGS. 11 and 12 are detailed flow charts corresponding to FIG. 10.

The communication control controls the telephonic interface 105 and communicates the information when it is known that a communication flag generated by a block 817 in FIG. 11 has become "1".

The communication flag is reset to "O" when the communication control has ended.

Figure 7:
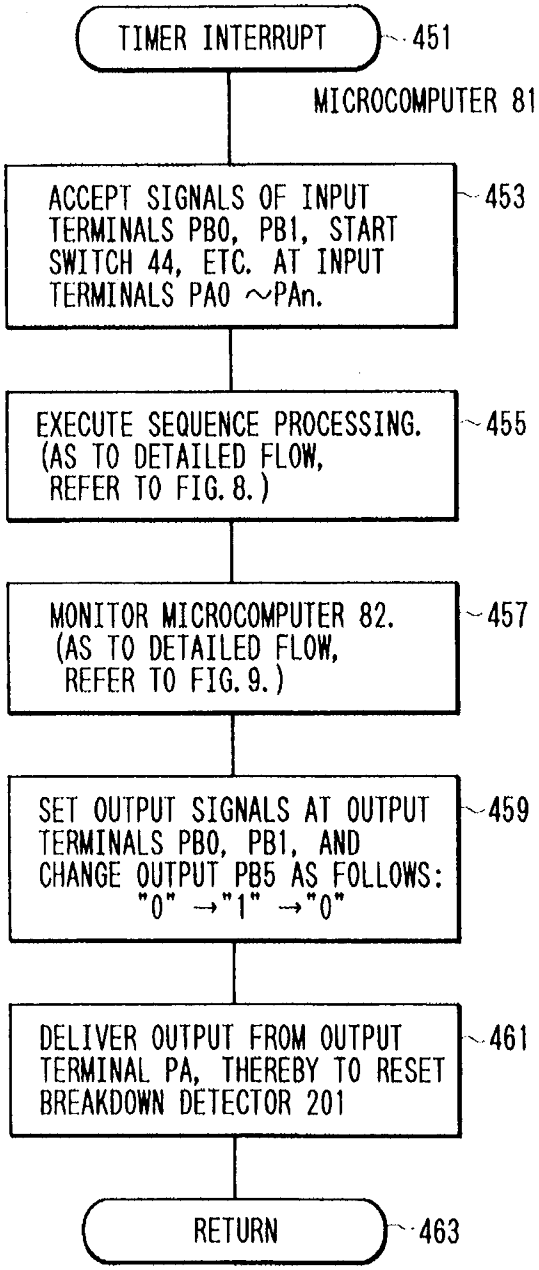
FIG. 7 is a flow chart of the first microcomputer at a timer interrupt in the same.

FIG. 7 is the flow chart of that sequence processing relevant to the running control which the microcomputer 81 executes on the basis of a timer interrupt arising every fixed cycle. The Passenger conveyor is started or stopped by this sequence processing. By the way, the reason why input signals are collectively accepted by a block 453 before the processing is that, even when any input signal changes amid the processing, the change is prevented from influencing the processing. Besides, the reason why outputs are collectively delivered by a block 459 is that dispersion in processing timings is avoided.

In addition to the above, there are executed the processing of monitoring the breakdown of the microcomputer 82 and the processing of resetting the breakdown detector 202.

The interrupt processing is ended by the last terminal 463 (return), and the control flow returns to the terminal 419 (loop) in FIG. 5.

Figure 8:
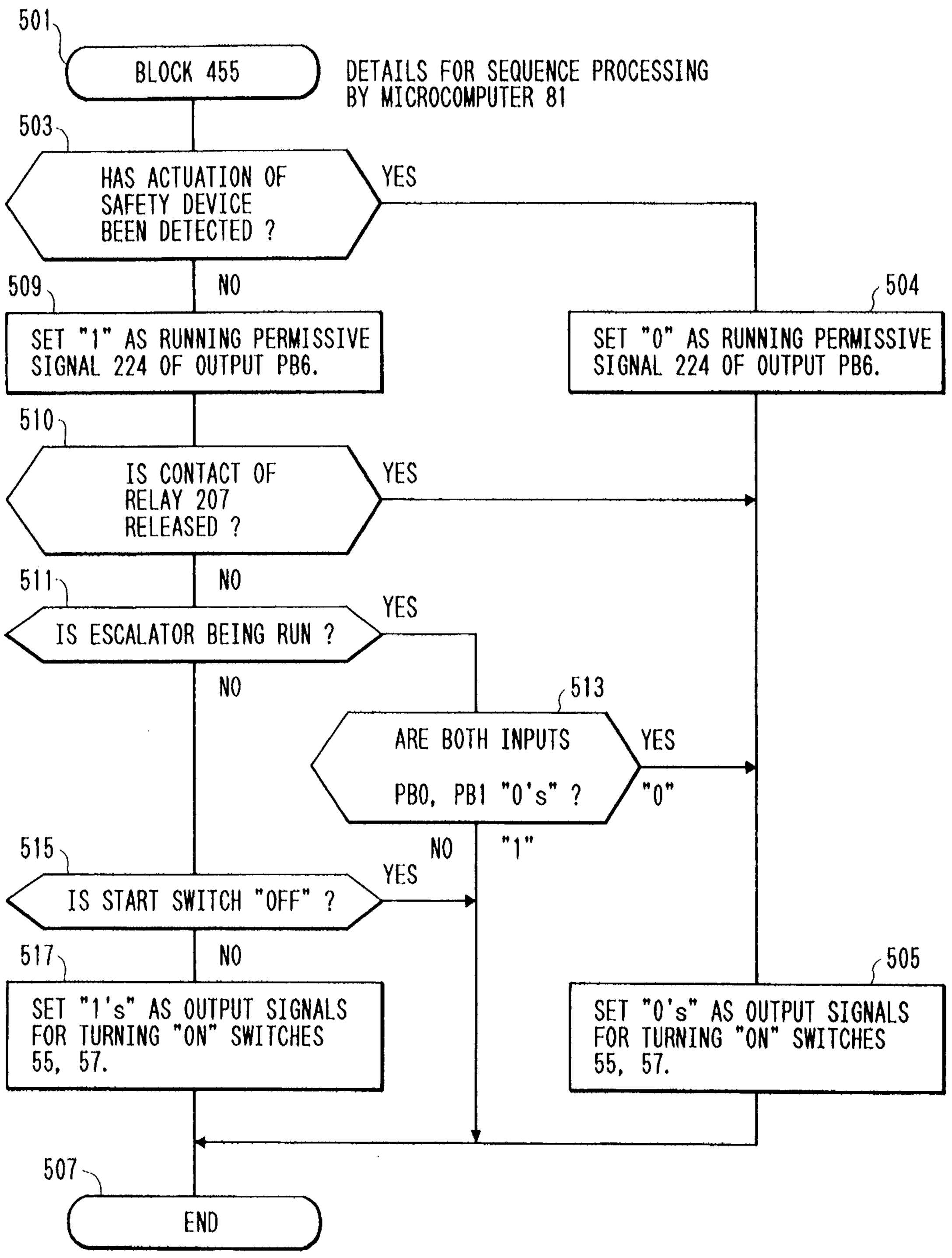
FIGS. 8 and 9 are detailed flow charts corresponding to FIG. 7.

FIG. 8 is the detailed flow chart (concerning) corresponding to the sequence processing of the block 455 in FIG. 7. With this program, the running permissive signal 224 is output, and the escalator is started or stopped. By the way, whether the escalator is being run or is stopped in a block 511 is judged on the basis of output signals to the electromagnetic switches for up and for down 55, 57f as are executed in blocks 505 and 517.

In this embodiment, the program is such that the escalator is stopped as soon as the actuation of any safety device has been detected. However, it is problematic for the safety of the passengers to stop the escalator in response to the momentary erroneous actuation of the safety device attributed to the inferior setting thereof or the like or in response to the momentary actuation occurring when the safety device is kicked by the passenger. Therefore, in a case where the embodiment is to be altered into a system in which such stops are avoided, the following measure may be taken:

The processing of producing a running non-permissive output in a block 504 is performed by the step of counting the number of times. By way of example, in a case where momentary actuations within 200 ms. are to be excluded, zero, "O" is delivered from the output PB6 so as not to permit the running when the block 504 has been passed six times successively, assuming that the timer interrupt of this program proceeds every 40 ms. If a block 509 has been executed before the number of times reaches six, the count of the number of times may be cleared. Incidentally, it is also possible that the count value is stored together with the kind of the actuated safety device so as to be utilized for maintenance and inspection.

Figure 9:
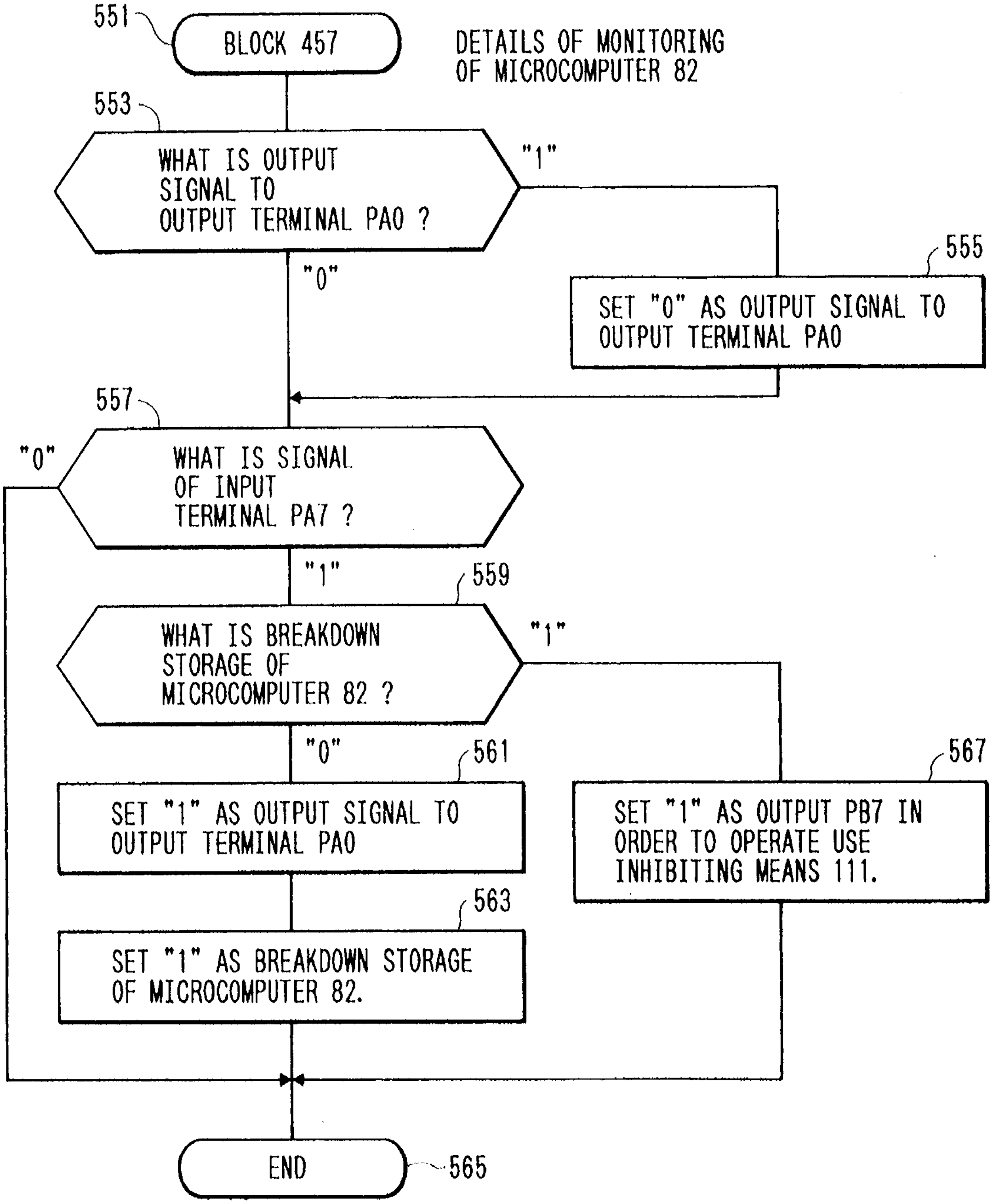

FIG. 9 is the detailed flow chart of the block 457 in FIG. 7, and the control flow executes the processing of monitoring the breakdown of the microcomputer 82.

As illustrated in the flow chart, this embodiment adopts a system in which the microcomputer 82 is retried only once and in which, at the second time, the use inhibiting means 11 is operated to caution the users so as not to get on the escalator. In a case where the microcomputer 82 is to be retried a plurality of times, additionally a program for counting the number of times may be added.

Figure 10:
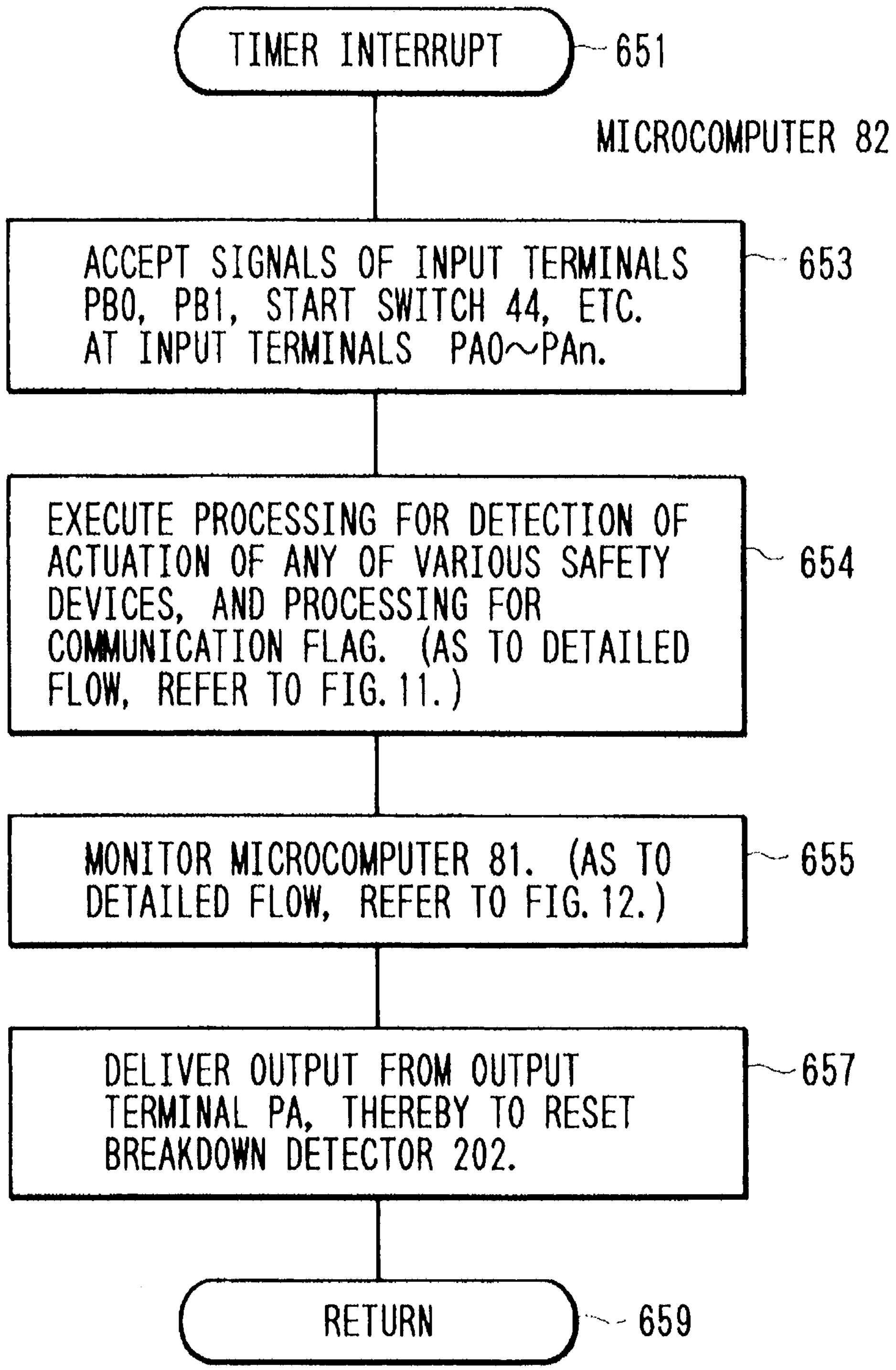
FIG. 10 is a flow chart of the second microcomputer at a timer interrupt in the same.

FIG. 10 is the flow chart of the processing of detecting the actuation of any of the various safety devices, monitoring the breakdown of the microcomputer 81, and resetting the breakdown detector 202, this processing being executed by the microcomputer 82 on the basis of a timer interrupt which occurs every fixed cycle.

The interrupt processing is ended by a terminal 659 (return), and the control flow returns to the block 609 (communication control) in FIG. 6.

FIG. 11 is the detailed flow chart relevant to the processing of detecting the actuation of any of the various safety devices and the processing of communication by the block 654 in FIG. 10.

Figure 12:
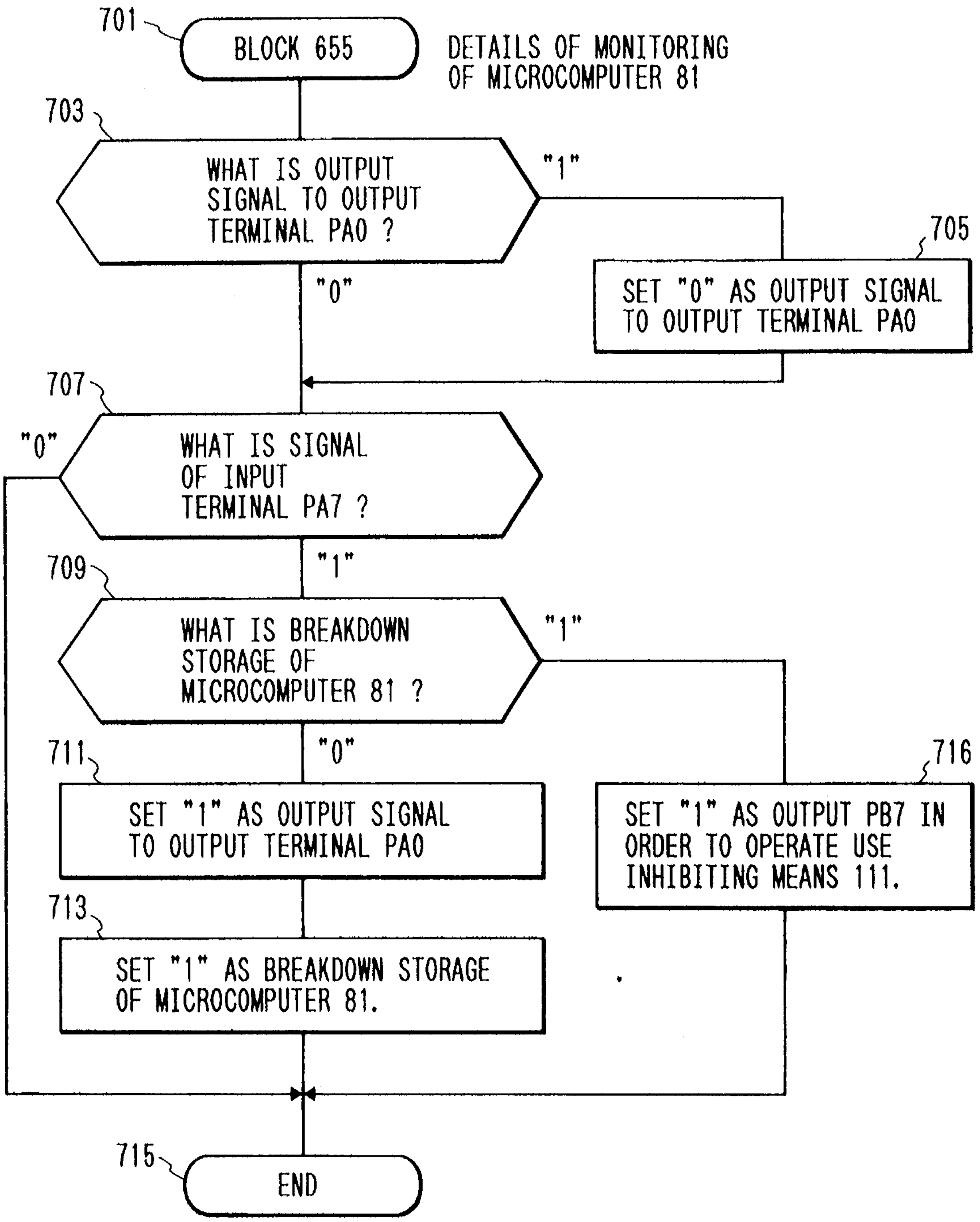

FIG. 12 is the detailed flow chart of that monitoring of the breakdown of the microcomputer 81 which is processed by the block 655 in FIG. 10.

This flow chart has no block for resetting the output transmitted to the use inhibiting means 111, likewise with respect to the flow chart of FIG. 9 corresponding to the microcomputer 81.

Referring to the drawings explained above, operations with the hardware and the software combined will now be described on individual items listed below. In the ensuring description, for the sake of brevity, the word "block" shall be omitted and only the indicated numeral shall be mentioned as to each of the processing blocks of the flow charts.

(1) Operation of Closure of Power Source (2) Operations at Start, Running and Stop
 (a) Start
 (b) Running
 (c) Stop (3) Operation at Actuation of Safety Device
 (a) Case where Safety Device has been Actuated since Closure of Power Source
 (b) Case where Safety Device of Manual Reset Type has been Actuated in course of Running . . . Communication to Centralized Monitoring Office 109
 (c) Case where Safety Deceive of Automatic Reset Type has been Actuated in course of Running (4) Operation at point of time when Microcomputer 81 has Broken Down (5) Operations in case where Safety Device has been Actuated during Breakdown of Microcomputer 81, and Means for Recovering Microcomputer 81

(6) Operation at Recovery of Microcomputer 81

(7) Operation at point of time when Microcomputer 82 has Broken Down (8) Operations in case where Safety Device has been Actuated during Breakdown of Microcomputer 82, and Means for Recovering Microcomputer 82
 (a) Operation of Means for Recovering Microcomputer 82
 (b) Actuation of Safety Device (1) Operation at turning of Power on When the power source of the control section 63 is closed, the running permissive signals 220, 224 are non-permissive as stated before; all of the storage of the FF's 301 of the output unit 203 is reset to "O" and the programs in FIGS. 5 and 6 are executed.

Specifically, the microcomputer 81 executes the control flow in FIG. 5 along the terminal 401 (closure of the power source→403 (initialize)→405 (resetting the breakdown detector 201)→407 (accepting inputs →415 (setting signals for maintaining the existing state) →417 (releasing the mask of interrupt)→terminal 419 (loop).

As stated above, the FF's 301 of the output unit 203 are reset. Therefore, even when the processing of the block 415 is executed, the output signals for the drive means 103 do not change.

After the interrupt mask release of the block 417, the program in FIG. 7 begins to operate in accordance with the timer interrupt occurring every fixed cycle.

This processing proceeds along the terminal 451 in FIG. 7 (timer interrupt)→453 (accepting inputs) →455 (sequence processing)→503 in FIG. 8 (detection of the actuation)→ 509 (detection of the stop) →510 (permission of the running)→511 (running) →515 (detection of the start)→terminal 507→457 in FIG. 7 (monitoring the opposite computer)→557 (detection of the breakdown)—>terminal 5656→459 in FIG. 7 (transferring outputs)→461 (resetting the breakdown detector)→terminal 463 (return).

On the other hand, the microcomputer 82 operates along the terminal 601 in FIG. 6 (closure of the power source)→ 603 (initialize)→605 (resetting the breakdown detector 202)→607 (releasing the mask of interrupt)(→609 (communication control loop).

After the interrupt mask release, the program in FIG. 10 begins to operate every timer interrupt. This program proceeds along the terminal 651 (timer interrupt) →653(accepting inputs)→654(detection of the actuation) →803 in FIG. 11 (detection of the actuation) →805 (running permission)→819 (storing the signals of the output memory)→ terminal 821→655 in FIG. 10 (monitoring the opposite computer)→7603 in FIG. 12 (detection of the retrial)→707 (detection of the breakdown)→terminal 715→657 in FIG. 10 (resetting the breakdown detector)→terminal 659 (return).

By the way, the expressions "LSI for I/O", "RAM" and "MPU" in the blocks 403 and 603 (initialize) of FIGS. 5 and 6 indicate devices constituting the microcomputers 81, 82, respectively.

(2) Operations at Start, Running and Stop

When the start switch 44 is manipulated in the course of the execution of the programs with the power source closed as described above, the controls are performed as follows:

(a) Start

The program proceeds along the terminal 451 (timer interrupt) in FIG. 7 illustrative of the flow of the microcomputer 81→453(accepting inputs)→455(sequence processing)→503(detection of the actuation) in FIG. 8→509 (running permission)→510 (detection of the stop)→511 (running)→515 (detection of the start)→517 (start)→terminal 507→457 (monitoring the opposite computer) in FIG. 7→→553→terminal 659 (return).

By the way, the expressions "LSI for I/O", "RAM" and "MPU" in the blocks 403 and 603 (initialize) of FIGS. 5 and 6 indicate devices constituting the microcomputers 81, 82, respectively.

(2) Operations at Start, Running and Stop

When the start switch 44 is manipulated in the course of the execution of the programs with the power source closed as described above, the controls are performed as follows:

(a) Start

The program proceeds along the terminal 451(timer interrupt) in FIG. 7 illustrative of the flow of the microcomputer 81→453(accepting inputs)→455(sequence processing)→ 503(detection of the actuation) in FIG. 8→509 (running permission)→510(detection of the stop)→511 (running)→ 515(detection of the start)→517 (start)→terminal 507→ 457(monitoring the opposite computer) in FIG. 7→553 in FIG. 9(detection of the retrial)→557(detection of the breakdown)→terminal 565→459(transferring outputs)→461(resetting the breakdown detector)→terminal 463 (return).

As a result, either of the electromagnetic switches for up and for down 55, 57 is turned "on", whereby the brake gear 61 is released, and the escalator begins to run.

(b) Running

With the timer interrupt subsequent to the execution of the program of the microcomputer 81, the flow proceeds along the terminal 451(timer interrupt) in FIG. 7→453 (accepting inputs)→455(sequence processing)→503 (detection of the actuation) in FIG. 8→509(running permission)→510(detection of the stop)→511(running) →513(detecting the signals of the output memory) terminal 507→457(monitoring the opposite computer) in FIG. 7→459 (transferring outputs)→ 461(resetting the breakdown detector)→terminal 463(return). Thus, once the escalator has been started, the start switch becomes irrelevant, and the start shifts to the steady running.

(c) Stop

When the stop switch 43 in FIG. 1 is manipulated, the power source across the terminals ACA–ACB is cut off, and hence, the safety relay 207 and the electromagnetic switches for up and for down 55, 57 are released. In consequence, the program of the microcomputer 81 is executed as follows:

This program proceeds along the terminal 451(timer interrupt) in FIG. 7→453(accepting inputs)→455 (sequence processing)→503(detection of the actuation) in FIG. 8→509(running permission)→510(detection of the stop)→ 505(stop)→terminal 507→457(monitoring the opposite computer) in FIG. 7→459(transferring outputs)→461(resetting the breakdown detector)→terminal 463(return), and it also performs the processing of stopping the interior of the microcomputer 81.

By the way, even if the stop processing for the microcomputer 81 is not performed on this occasion, the power source of the switches for up and for down 55, 57 is cut off as shown in FIG. 1, and hence, the escalator can be stopped reliably.

In starting the escalator again under this condition, the manipulation of the above item (a) Start is performed.

The program of the microcomputer 82 at the start, running and stop proceeds as follows:

The microcomputer 82 executes the processing of detecting the actuation of any safety device and detecting the breakdown of the microcomputer 81 at all times, along the terminal 651(timer interrupt) in FIG. 10→653 (accepting inputs)→654(detection of the actuation)→803 (detection of the actuation) in FIG. 11→805(running permission)→ 819(storing the signals of the output memory)→terminal 821→655(monitoring the opposite computer) in FIG. 10→703(detection of the retrial) in FIG. 12→707(detection of the breakdown)→terminal 715 →657(resetting the breakdown detector) in FIG. 10→terminal 659(return).

(3) Operation at Actuation of safety Device (a) Case where Safety Device has been Actuated since Closure of the Power Source In a case where any safety device has been actuated since the closure of the power source, the control flow proceeds along the terminal 451(timer interrupt) in FIG. 7 corresponding to the microcomputer 81→453(accepting inputs)→455(sequence processing)→503(detection of the actuation) in FIG. 8→504(nonpermission of the running)→ 505(stop)→terminal 507→457(monitoring the opposite computer) in FIG. 7, 459(transferring outputs) →461(resetting the breakdown detector)→terminal 463(return). Therefore, the block 517 for starting the escalator is not executed, and the signal of the start switch 44 is neglected. Moreover, the running permissive signal 224 is not output, and the escalator cannot be run and is held stopped.

On the other hand, the microcomputer 82 executes the following processing:

The processing proceeds along the terminal 651 in FIG. 10→653(accepting inputs)→654(detection of the actuation)→803(detection of the actuation) in FIG. 11 →810(non-permission of the running)→811(detecting the last signals of the output memory)→819(storing the signals of the output memory)→terminal 821→655 (monitoring the opposite computer) in FIG. 10→657 (resetting the breakdown detector)→terminal 659. Thus, although the actuation of the safety device has been detected, both the outputs Q1, 2 of the output memory 203 at the time of the detection are "O's" indicative of the stop state, so that the communication to the centralized monitoring office 109 is not done even if the safety device is of the manual reset type. That is, in this embodiment, the actuation of the safety device during the stop of the escalator is judged as one based on the inspection of maintenance or the like. Of course, the block 811 may well be removed so as to communicate a message only when any of the manual reset type safety devices has been actuated.

Since the non-permission is output by the block 810, the escalator cannot be started even if it is tried to run with the microcomputer 81.

(b) Case where Safety Device of Manual Reset Type has been Actuated in the course of Running.

Communication to Centralized Monitoring Office 109

When the safety device has been actuated, the execution state of the above item (b) Running, in (2) Operations at Start, Running and Stop shifts into the execution state of the above item (a), Case where Safety Device has been Actuated since Closure of Power Source, in (3), Operation at Actuation of Safety Device, so that the escalator is stopped immediately.

Meantime, the microcomputer 82 detects the actuation of the safety device in the course of the running and sets the communication flag, along the terminal 651 in FIG. 10→653 (accepting inputs)→654(detection 4 of the actuation) →803(detection of the actuation) in FIG. 11→810 (non-permission of the running)→811(detecting the last signals of the output memory)→815(finding the manual reset type)→ 817(communication flag)→819 (storing the signals of the output memory)→terminal 821 655(monitoring the opposite computer) in FIG. 10→657 (resetting the breakdown detector)→terminal 659. Consequently, as soon as this program has ended, the flag is detected by the block 609 (communication control loop) in FIG. 6, and the telephonic interface 105 is controlled to notify the centralized monitoring office 109 of the actuation of the manual reset type safety device. Upon the notification, the repair person rushes from the centralized monitoring office 109 and inspects the escalator. Thereafter, he/she resumes the safety device into an operating state.

Which one of the safety devices that has been actuated, is easily known to the repair person especially, since the detected results have been stored in the microcomputers 81, 82 as disclosed in Japanese Patent Application Laid-open No. 11402/1980 mentioned before. In this case, the two microcomputers 81, 82 are previously set so as to store the actuation detection results, whereby even of one of the microcomputers has broken down, the portion of the actuation can be reliably known from the storage of the other.

When this control has ended, the communication flag is reset. Besides, although not performed in this embodiment, the kind and the function of the actuated safety device, the number of times of the actuations, for example, are stored to collectively communicate the stored information items are collectively communicated to the centralized monitoring office 109 at another trial.

Moreover, since the running permissive signal 220 is not output (is set to "0") by the block 310 (non-permission of the running), the input KYK of the output memory 203 becomes "0". Thus, even if the escalator fails to be stopped by the microcomputer 81, it can be stopped by the corresponding signal of the microcomputer 82. Therefore, the embodiment is effective to stop the escalator safely and reliably.

(c) Case where Safety Device of Automatic Reset Type has been Actuated in course of Running In a case where any of the safety devices of the automatic reset type has been actuated, the processing of the microcomputer 81 is the same as in the foregoing. In contrast, the processing of the microcomputer 32 differs from the foregoing such that it proceeds from the block 815 (finding the manual reset type) in FIG. 11 to the terminal 821 and ends without regard to the communication flag. Therefore, the communication to the centralizes monitoring office 109 is not done, and only the stop processing based on the running non-permissive output is performed.

When a cause for the actuation of the safety device of the automatic reset type is eliminated, the safety device is resumed. Therefore, the running permission signal, and the escalator is permitted to run through the start switch.

(4) Operation at point of time when Microcomputer 81 has Broken Down

When the breakdown detector 201 has detected the breakdown of the microcomputer 31, an "1" is applied from the output OUT of the detector to the input CUT of the output memory 203, and hence, the changes of the FF's 301 cease at the point of time of detection (refer to the foregoing description of the operation in FIG. 4). That is, the stored status of the FF's 301 at the point of time of the detection of the breakdown are not changed and remain unchanged.

Besides, the signal of the output OUT of the breakdown detector 201 is also input to the gate 225. Thus, even when the running permissive signal 224 from the output PB6 of the microcomputer 81 thereafter is not changed to the permission signal, the running permissive signal 224 is invalidated, and hence, the input KYK of the output memory 203 is not affected. Accordingly, the escalator having been run at the time of the breakdown is continuously run.

In order to attain this purpose, the cycle of the output operation of the microcomputer 81 is set longer than the cycle of the breakdown detection of the watchdog timer which constructs the breakdown detector.

(5) Operations in case where Safety Device has been Actuated during Breakdown Of Microcomputer 81, and Means for Recovering Microcomputer 91

At the breakdown of the microcomputer 81, the FF's 301 of the output memory 203 are cut away from the microcomputer 81 by the signal of the input CUT. However, the FF's maintain the stored status immediately preceding the breakdown, unchanged, so that the escalator in the running state can continue running Ln accordance with the stored signals.

When the stop switch 43 is manipulated at this point of time, the electromagnetic switches for upward for down 55, 57 are directly cut off, and the escalator is stopped.

In addition, when the manual reset type safety device switch 46 or the automatic reset type safety device switch 47 is actuated, the output PB6 of the microcomputer 82 having detected the actuation renders the running permissive signal 220 ineffective and produces "O", which brings the input KYK of the output memory 203 to "O" through the gate 223. Therefore, the storage of the FF's 301 is entirely reset, and the escalator is stopped.

With the prior art, when the microcomputer has broken down in this manner, the actuation of the safety device cannot be detected. In contrast, with this embodiment, even when the microcomputer 81 has broken down, the safety of the passengers is maintained, and besides, this actuation of the safety devices of the passengers is maintained, and besides, the actuation of the safety devices which has been actuated can be stored by the microcomputer which has not broken down.

By the way, even when the microcomputer U1 has erroneously operated to render the running permissive signal 224 of its output PB6 inactive, this signal is invalidated by the signal of the breakdown detector 201 as stated before, so that the escalator is not stopped erroneously.

In addition, when the microcomputer 32 has realized the breakdown of the microcomputer 81 from the signal of its input PA7, it delivers the signal from its output PAO begging the recovery means stated before, thereby to recover the microcomputer 81. The operation in the case where the microcomputer 81 has been recovered in this way, will be explained in the next item (6).

The flow charts of the microcomputer 82 wick executes the above processing will now be described on a case where the means for recovering the microcomputer 81 Ls operated because of the breakdown of this microcomputer while running of the escalator, and on a case where any of the automatic reset type safety devices has been actuated.

The microcomputer 82 renders the running permissive signal 220 non-permissive to stop the escalator and delivers the signal from its output PAO to restart the microcomputer 81, along the terminal 651 in FIG. 10→653(accepting inputs)→654(detection of the actuation)→803 (detection of the actuation) in FIG. 11→810 (non-permission of the running)→811(detecting the last signals of the output memory)→815(finding the manual reset type)→819(storing the signals of the output memory the terminal 821→655(monitoring the opposite computer) in FIG. 10→703(retrial detection) in FIG. 12→707 (breakdown detection)→709(re-breakdown)→711 (retrial)→713(breakdown storage)→terminal 715 657(resetting the breakdown detector)→terminal 659 (return).

In the next timer interrupt, the output signal from the output PAO of the microcomputer 82 is reset, along the terminal 651 in FIG. 10→653(accepting inputs)→654 654(detection of the actuation)→655(monitoring the opposite of computer)→703(retrial detection) in FIG. 12 →705(resetting the retrial)→707 (breakdown detection) the terminal 715→657(resetting the breakdown detector) in FIG. 10→the terminal 659(return). Incidentally, as a result of the reset signal of the output PAO of the microcomputer 82, the breakdown detector 201 is reset to its initial state simultaneously with the resetting of the microcomputer 81.

In a case where the microcomputer 81 is not recovered by this retry or where it has broken down again, the use inhibiting means 111 is operated with the output PB7 of the microcomputer 82, and any new user is inhibited from getting on the escalator, thereby to ensure the safety of the user, along the terminal 651 in FIG.10→65 ii (accepting inputs) 654(detection of the actuation) 655 monitoring the opposite computer)→703(retrial detection in FIG. 12→707 (breakdown detection)→709(re-breakdown) 716 (inhibiting the use)→the terminal 715→65" (resetting the breakdown detector) in FIG. 10—the terminal 659(return).

(6) Operation at Recovery of Microcomputer 81

When the microcomputer 81 has been recovered, the program is executed as in the item (1) Operation at Closure of Power Source. More specifically, the operating situation of the signal of the start switch 44 is checked, while at the same time, the output Q1, 2 of the output memory 203 are checked with the inputs PBO, 1 thereof. If, as a result, the escalator is being run, either the input PBO or PB1 has a signal, and hence, the running is continued in accordance with the signal. When no signal exists, the situation is set unchanged in order to continue the stopped state of the escalator.

Besides, when the timer interrupt arises, the program is executed as shown in FIG. 7, and hence, the control flow proceeds as described in the item (2) Operations at Start, Running and Stop.

(7) Operation at the point of time when Microcomputer 82 has Broken Down

When the breakdown detector 202 of the microcomputer 82 has detected the breakdown thereof, the breakdown signal "1" is applied from the OutPut OUT of this detector to the gate 221. Thus, even when the running permissive signal 220 from the output PB6 of the microcomputer 82 thereafter is changed erroneously to issue the non-permission, it is invalidated, and hence, the input KYK of the output memory 203 is not affected. The escalator is therefore run in accordance with the control of the microcomputer 81, so that the passengers on the escalator can be safely maintained thereon.

(8) Operations in case where Safety Device has been Actuated during Breakdown of Microcomputer 82, and Means for Recovering Microcomputer 82

(a) Operation of Means for Recovering Microcomputer 82

When the breakdown detector 202 of the microcomputer 32 has detected the breakdown thereof and the microcomputer 81 receives the breakdown from the signal of Lts input PA7 of, the microcomputer 81 delivers the signal from its output PAO serving as the recovery means as stated before, thereby to recover the microcomputer 82.

The operation of the program of the microcomputer 81 in this case is as follows:

The microcomputer 81 retries the microcomputer 82 with the control flow of the terminal 451(timer interrupt) in FIG. 7→453(accepting inputs)→455(sequence processing)→457(monitoring the opposite computer)→553 (detection of the retrial) in FIG. 9→557(detection of the breakdown)→559(re-breakdown)→561(retrial)→563 (breakdown storage)→terminal 565→459(transferring outputs) in FIG. 7→461(resetting the breakdown detector) terminal 463(return).

When the flow chart in FIG. 7 is executed again with the next timer interrupt, the microcomputer 81 resets the signal of the retrial for the microcomputer 82 and ends the retrial, along the terminal 451(timer interrupt)→453 (accepting inputs)→455(sequence processing→457 (monitoring the opposite computer)→553(detection of the retrial) in FIG. 9→555(resetting the retrial)→557 (detection of the breakdown)→terminal 565→459 (transferring outputs) in FIG. 7→461(resetting the breakdown detector)→terminal 463(return).

In a case where the microcomputer 82 has not been recovered by this retrial, the detection of the actuation of any of the safety devices by the two microcomputers is not effected. As stated before, therefore, the use inhibiting means Ill is operated with the output PB7, and a person who attempts to get on the escalator is informed that the escalator should not be used.

The program on this occasion operates the use inhibiting means 111, along the terminal 451 (timer interrupt) in FIG. 7→453(accepting inputs)→455 (sequence processing)→457(monitoring the opposite computer) 553(detection of the retrial) in FIG. 9 557(detection of the breakdown)→559(re-breakdown)→567 (inhibition of the use)→terminal 565→459 (transferring outputs) in FIG. 7→461 (resetting the breakdown detector)→terminal 463 (return).

In a case, where the microcomputer 82 has been recovered, the program is executed as in the item (1) Operation at Closure of Power Source.

(b) Actuation of Safety Device

In a case, where the safety device 46 or 47 has been actuated during the breakdown of the microcomputer 82, the signal of the actuation is processed by only the microcomputer 81. The operation of the program on this occasion is the same as the item (3), Operation at Actuation of Safety Device. On this occasion, however, the microcomputer 82 cannot react to the actuation because of its breakdown, and the microcomputer 91 can store the kind, the example, of the actuated safety device in order to take such a measure as examining them in an inspection operation, just as in the foregoing case where the microcomputer 81 has broken down and where the actuation of any safety device is stored by the microcomputer 82.

With this embodiment, there is the drawback that, when the safety device of the manual reset type has been actuated during the breakdown of the microcomputer 82, the control of communicating the actuation to the centralized monitoring office 109 through the public circuit 107 cannot be performed. For the purpose of eliminating the drawback, the telephonic interface 105 is switched to the microcomputer 81 when the microcomputer 82 has broken down or the telephonic interface 105 is additionally connected also to the microcomputer 81.

Next, another embodiment of the present invention will be described with reference to FIGS. 13 and 14.

Figure 13:
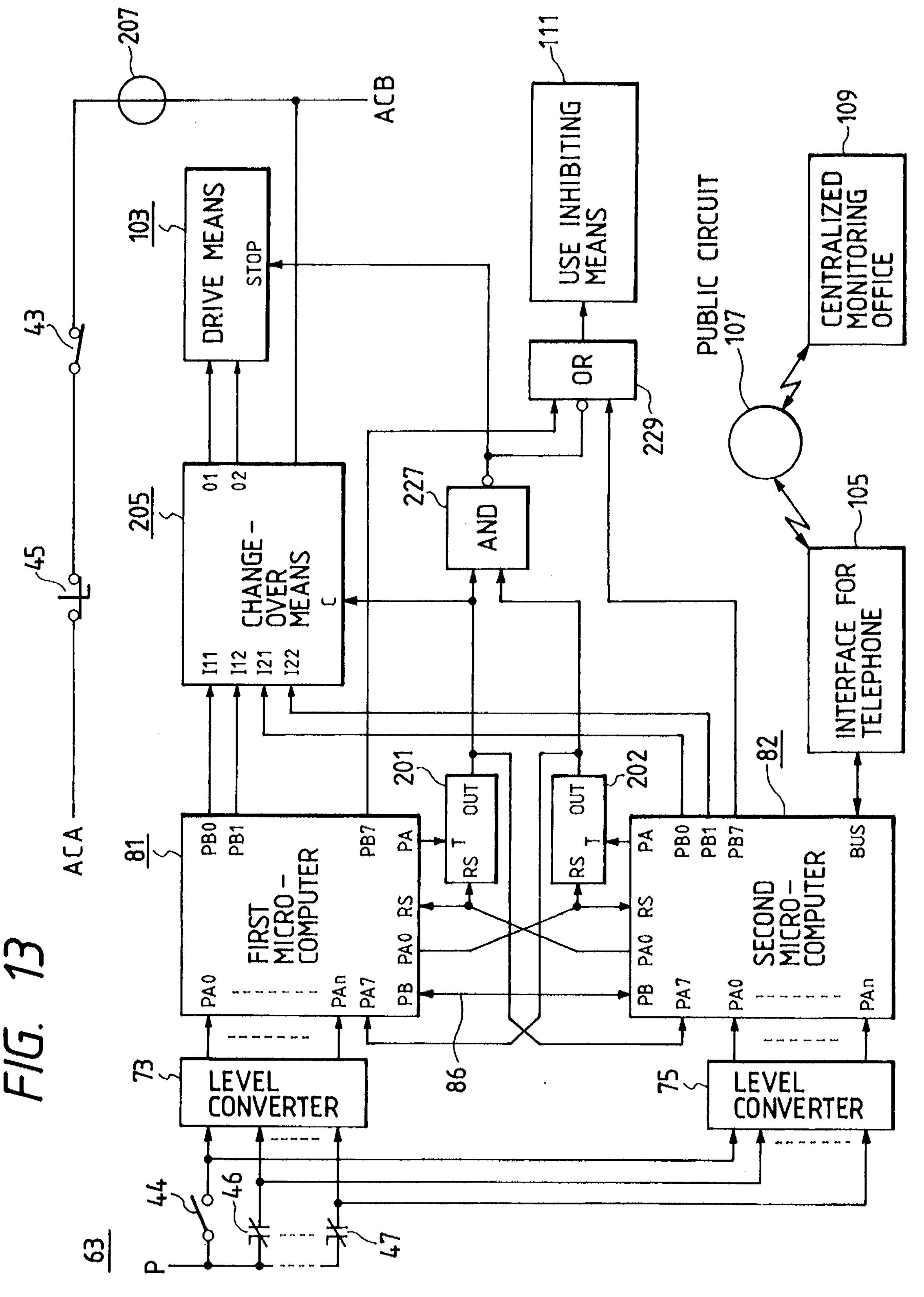
FIG. 13 is a detailed block diagram of a logic control section according to the second embodiment of the present invention.
Figure 14:
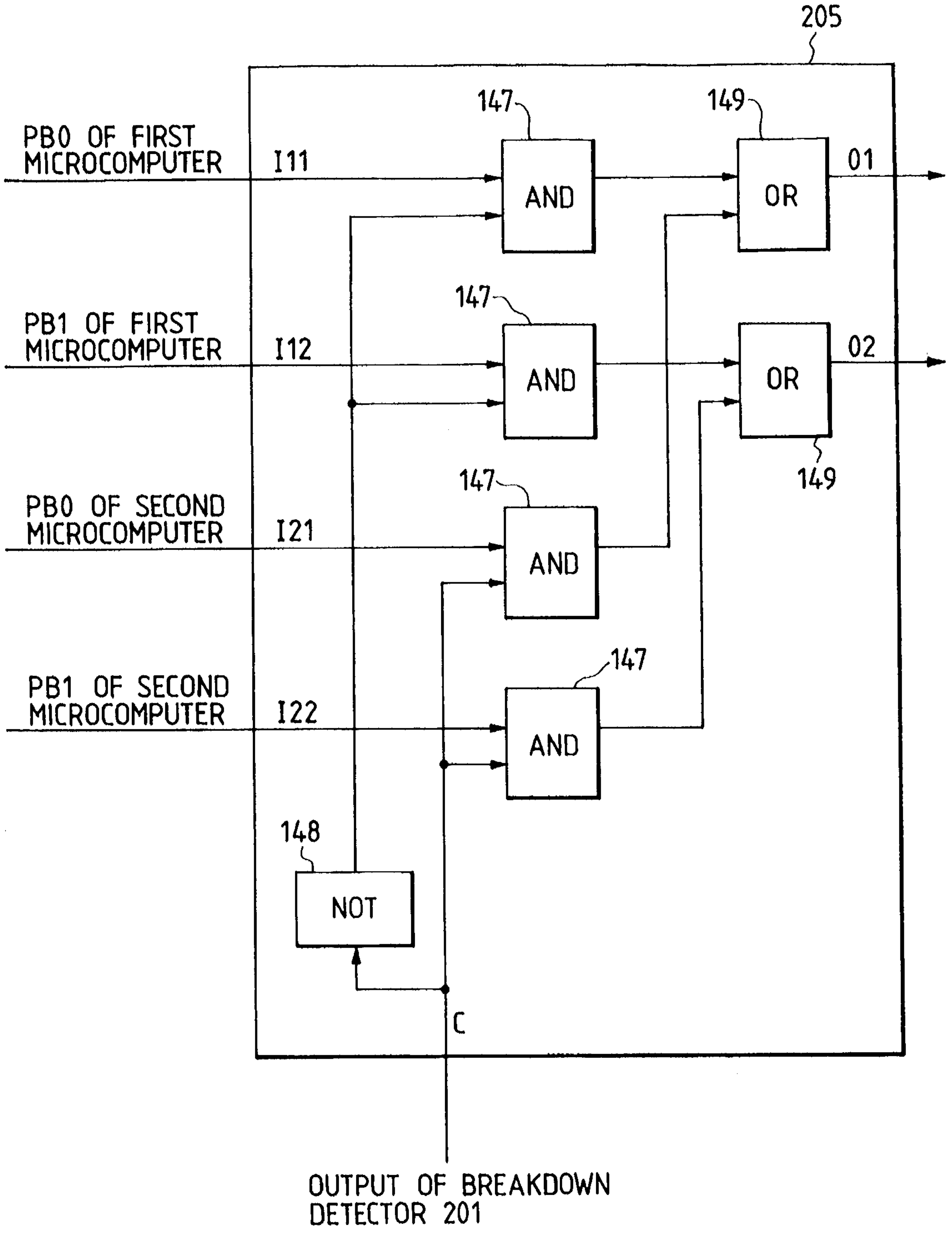
FIG. 14 is a detailed circuit diagram of change-over means according to present invention.

FIG. 13 is a detailed block diagram principally showing a logic control section 63, and FIG. 14 shows change-over means 205 which replaces the output memory 203 illustrated in FIG. 4.

In FIG. 13, identical symbols are assigned to elements which have the same functions as Ln the preceding embodiment shown in FIG. 1. These symbols are as mentioned below.

Numeral 44 indicates a start switch; numeral 46 indicates the switch of a manual reset type safety device; numeral 47 indicates the switch of an automatic reset type safety device; numerals 73 and 75 indicate level converters; numerals 81 and 82 first and second microcomputers, respectively; numeral 105 indicates an interface for telephone; numeral 107 indicates a public circuit; numeral 109 indicates a centralized monitoring office; numeral 111 indicates use inhibiting means; numerals 201 and 202 indicate breakdown detectors; numeral 227 indicates and AND gate, and numeral 229 indicates an OR gate.

The microcomputers 81, 82 are the same as in the foregoing with respect to hardware, except that both the microcomputers are equipped with terminals for communications PB and a communication line 86. However, the application programs of the microcomputer differ as stated below.

The program of the microcomputer 81 is the same as in the embodiment of FIG. 1, except that, in case of transferring outputs, the signals of output PBO, 1 directly operate drive means 103 (in which the electromagnetic switches for up and for down 55, 57 shown in FIG. 1 are built), and that the control of the output ?36 of the embodiment illustrated in FIG. I is not included.

The program of the microcomputer 82 is such that a portion concerning the communication control of the preceding embodiment is added to the program of the microcomputer 81.

In addition, the breakdown detector 201 differs from that of the preceding embodiment as to the point of time at which a signal delivered from an output OUT returns to "O" owing to the recovery of the microcomputer 81 from the breakdown thereof. More specifically, the time at which the signal becomes "1" due to the breakdown is the same, but the signal becomes "O" on the basis of a resetting output, for example, resetting the breakdown detector in FIG. 7 which is delivered from the output PA of the microcomputer 81 to the input T of the breakdown detector 201 for the first time after the recovery of this microcomputer. Accordingly, means for detecting the recovery from the breakdown if the microcomputer 81 has been recovered, the period of time which is required for producing the resetting output.

The other points differing from the preceding embodiment will be further described below.

In the preceding embodiment, the output memory 203 intervenes for the control between the drive means 103 and the microcomputer 81. In this embodiment, the changeover means 205 replaces the output memory.

The details of the change-over means 205 will be described with reference to FIG. 14.

In FIG. 14, two channels of inputs, which consist of inputs I11 and I12 connected with the outputs OBO, 1 of the microcomputer 81 and inputs I21 and I22 connected with the outputs PBO, 1 of the microcomputer 82, are respectively connected to AND gates 147. The other input of each of the AND gates 147 for the microcomputer 82 is connected to an input C connected with the output OUT of the breakdown detector 201, while the other input of each of the AND gates 147 for the microcomputer 81 is connected to the output of a NOT gate 148 for inverting the signal of the input C. Besides, the outputs of one of the AND gates 147 for the microcomputer 81 and one of the AND gates 147 for the microcomputer 82, and the outputs of the other AND gate 147 for the microcomputer 81 and the other AND gate 147 for the microcomputer 92 are respectively connected to the inputs of OR gates 149, the outputs of which are connected to the drive means 103 from outputs 01 and 02 as the outputs of the change-over means 205. Incidentally, the SSR's 303 within the output memory 203 are omitted from illustration.

With the change-over means 205, accordingly, when the input C is "O" from the reception of "O" from the output OUT of the breakdown detector 201, for example, (the microcomputer 81 is operating normally), the signals received at the inputs Ill and I12 are delivered from the outputs 01 and 02, respectively. That is, when the microcomputer 81 is normal, the escalator is run by the signals of this microcomputer.

On the other hand, when the microcomputer 81 has broken down and has had the breakdown detected by the breakdown detector 201, an one "1" is applied to the input C of the change-over means 205. Therefore, the input signals of the breakdown detector are changed-over to the signals of the outputs PBO, I of the microcomputer 82 received at the inputs I21 and I22, and the escalator is operated by the microcomputer 82.

Since this embodiment is thus constructed, the escalator is operated without being stopped due to the breakdown of the microcomputer 81, and the passengers can accordingly be conveyed safely.

The reason why, as stated above, the input signals can be immediately changed-over to continue the operation, is that the inputs are connected in quite the same manner and that the same programs are executed in accordance with the input signals. It is also utilized in the construction that, since the signals are ones for starting and stopping the escalator, they do not undergo sudden changes temporally, such that when they are changed-over, they do not cause any disagreement or contradiction in the operation of the escalator.

After the input signals have been changed-over as described above, the microcomputer 81 is recovered by the recovery means of the microcomputer 82 in the same manner as in the preceding embodiment. Then, the first program of the microcomputer 81 corresponding to the block 415, for example, executes the processing of receiving signals indicative of the present operating states of the escalator from the microcomputer 82 through the communication line 86 and setting the values of these signals at the outputs PBO, 1 so as to continue the subsequent running on the basis of the set values.

That is, when the resetting output (resetting the breakdown detector) in FIG. 7 concerning the preceding embodiment] the delivery of which is first executed is produced, the output OUT of the breakdown detector 201 becomes "O" so that the drive means 103 is changed-over to the inputs Ill and I12 of the change-over 205, namely, the outputs of the microcomputer 81 again, and the running of the escalator is continuously controlled as before.

As with the preceding embodiment, when the breakdown is not remedied on this occasion, an output signal is delivered from the output PB7 of the microcomputer 82 to the use inhibiting means 111, thereby preventing users from entering on the escalator.

Meanwhile, when the microcomputer 82 has broken down, the state of the change-over means 205 is not affected by the resulting signal, and hence, the breakdown is controlled irrespective of the operation of the escalator. Besides, as with the preceding embodiment, when the microcomputer 82 does not recover despite the even with recovery means, an output signal is delivered from the output P37 of the microcomputer 81 to the use inhibiting means 111, thereby cautioning the users not to enter on the escalator.

Further, when both the microcomputers 81 and 82 have broken down, this situation is detected by the gate 227, the output signal of which is applied to the input STOP of the drive means 103, thereby cutting off the drive means and to stopping the escalator. Therefore, the escalator is not run with no control.

In the case of the actuation of any safety.i device, when the microcomputer 81 has detected the actuation, the outputs PBO, I become "O's", and the gates 147 of the change-over means 205 function to render the outputs 01, 02 thereof "O's", thereby stopping the escalator, and when the microcomputer 82 has detected the actuation, it notifies the microcomputer 81 of the detector through the communication line 86, thereby stopping the escalator by means of the microcomputer 81. Therefore, even in such cases where the level converter 73 or 75 has broken down, for example, the escalator can be stopped reliably.

Incidentally, in such a case where the microcomputer 81 has broken down and is incapable of stopping the escalator, the operation of the change-over means 205 is transferred to the microcomputer 82 by the breakdown detector 201, and hence, the escalator can be stopped by using the outputs PBO, 1 of the microcomputer 82 directly.

In addition, when the microcomputer 81 has detected the actuation of any safety device, it notified the microcomputer 82 of the actuation through the communication line 86, and the microcomputer 82 stores the received result together with the actuation detection result of its own, for future maintenance and inspection. Besides, if the actuated safety device is of the manual reset type, the microcomputer 82 controls the telephonic interface 105 so as to communicate the actuation to the centralized monitoring office 109.

When the breakdown detector 201 of the microcomputer 81 has detected the breakdown thereof, the microcomputer 82 communicates the breakdown upon receipt of the breakdown indicator; the passenger conveyor can be promptly restored without standing idle in its unstable state in which the microcomputer breaks down, and hence, the control apparatus can render the passenger conveyor safe and reliable.

Next, the third embodiment of the present invention will be described with reference to FIGS. 15 and 16.

Figure 15:
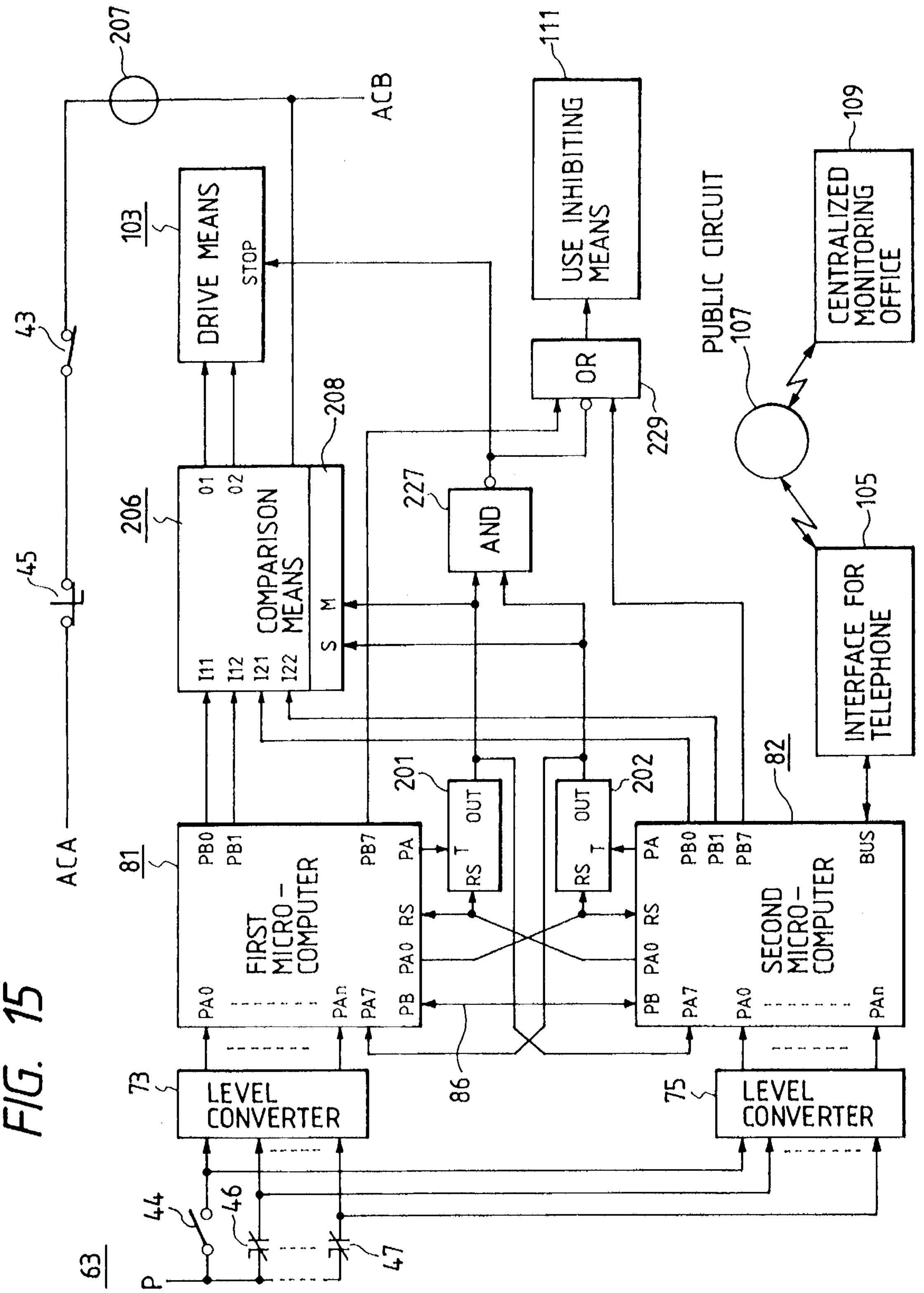
FIG. 15 is a detailed block diagram of a logic control section according to the third embodiment of the present invention.
Figure 16:
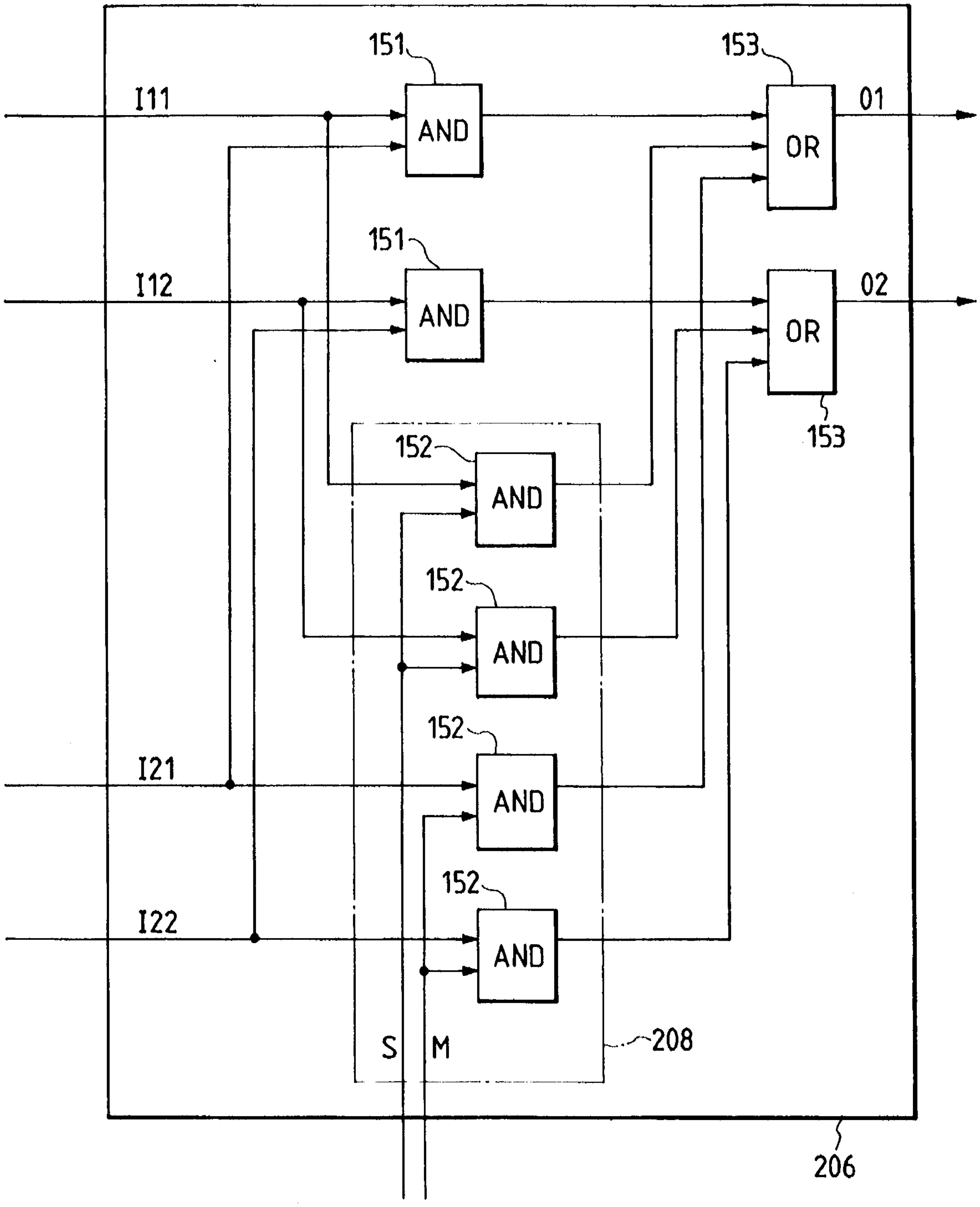
FIG. 16 is a detailed circuit diagram of comparison means and microcomputer output invalidation means.

FIG. 15 is a detailed block diagram of a logic control section 63, and FIG. 16 shows comparison means 206 and microcomputer output invalidation means 208 which replace the output memory 203 in FIG. 1.

In FIG. 15, identical symbols are assigned to elements which have the same functions as in the first embodiment shown in FIG. 1. These symbols are as mentioned below.

Numeral 44 indicates a start switch; numeral 46 indicates the switch of a manual reset type safety device; numeral 47 indicates the switch of an automatic reset type safety device; numerals 73 and 75 indicates level converters; numerals 31 and 82 indicate first and second microcomputers, respectively; numeral 105 indicates an interface for telephone; numeral 107 indicates a public circuit; numeral 109 indicates a centralized monitoring office; numeral 111 indicates use inhibiting means; numerals 201 and 202 indicate breakdown detectors; numeral 227 indicates an AND gate, and numeral 229 indicates an OR gate.

The microcomputers 81, 82 are the same as in the foregoing with respect to hardware, except that both the microcomputers 81, 82 are equipped with terminals for communications PB and a communication line 86 (this communication line 86 need not be included when means for recovering each microcomputer which has broken down is unnecessary). However, the application programs of the microcomputers differ as stated below.

The program of the microcomputer 81 is the same as in the first embodiment shown in FIG. 1, except that, in the case of transferring outputs, the signals of outputs PBO, 1 directly operate drive means 103 (in which the electromagnetic switches 55, 57 for up and for down shown in FIG. 1 are built), and that the control of the output PB6 of the first embodiment illustrated in FIG. 1 is not included.

The program of the microcomputer 82 is such that a portion concerning the communication control of the first embodiment is added to the program of the microcomputer 81.

In addition, the breakdown detector 201 differs from that of the preceding embodiment as time at which a signal delivered from an output OUT returns to "O" resulting from the recovery of the microcomputer 81 from the breakdown. More specifically, the time at which the signal becomes "1" due to the breakdown remains unchanged, but the signal becomes "O" on the basis of a resetting output {the block 461 (resetting the breakdown detector) in FIG. 7 concerning the first embodiment} which is delivered from the output PA of the microcomputer 81 to the input T of the breakdown detector 201 for the first time after the recovery of this microcomputer. Accordingly, means for detecting the recovery from the breakdown if the microcomputer 81 has recovered, indicated of the period of time which is required for producing the resetting output.

The other points differing from the first embodiment will be further described below.

In the first embodiment, the output memory 203 intervenes for the control between the drive means 103 and the microcomputer 81. In this embodiment, the comparison means 206 and the microcomputer output invalidation means 208 replace the output memory.

The details of the comparison means 206 and the microcomputer output invalidation means 208 will be described with reference to FIG. 16.

In FIG. 16, two channels of inputs, which consist of inputs Ill and I12 connected with the outputs PBO, I of the microcomputer 81 and inputs I21 and I22 connected with the outputs PBO, 1 of the microcomputer 82, are connected to the respectively corresponding inputs of AND gates 151.

Further, each of the inputs Ill–122 is connected to one input of the respectively corresponding AND gates 152. The other inputs the AND gates 152, and those remaining are connected to inputs S and M connected with the output OUT of the breakdown detector 201 and that of the breakdown detector 202, respectively. Besides, the outputs of the AND gates 151 and 152 are connected to the inputs of corresponding OR gates 153, respectively, the outputs are connected to the drive means 103 as the outputs 01 and 02 of the comparison means 206. Incidentally, the SSR's 303 within the output memory 203 are omitted from illustration also here.

With the comparison means 206 and the microcomputer output invalidation means 208, accordingly, when "O's" are delivered from the outputs OUT's of the breakdown detectors 201 and 202, for example, the outputs of the AND gates 152 become "O's". Only in a case where the signals of the inputs Ill and I12 delivered from the microcomputer 81 and those of the inputs I21 and I22 delivered from the microcomputer 82 agree, does the signal become the outputs of the AND gates 151, and, further, they are delivered as the signals of the outputs of the OR gates 153, namely, the outputs 01 and 02 of the comparison means 206.

That is, this embodiment is so constructed that the invalidation means unconditionally validates tie outputs of the microcomputer which is not defective, thereby to invalidate the outputs of the microcomputer which is defective.

Due to such a construction, even when the signal input of any safety device does not change due to the breakdown of part of the level converter 73 bl way of example, the microcomputer 82 can detect the actuation of the safety device subject to the normality of the level converter 75, and hence, it executes an operation for stopping the escalator. As a result, the inputs of the comparison means 206 disagree, and signals for the stop are preferentially output from the circuit of this embodiment, so that the escalator is stopped by the drive means 103. In this manner, the escalator can be reliably stopped even at the breakdown of the level converter 73.

As described above, when the microcomputers 81 and 82 are normal, their signals agreeing are used for running the escalator.

Next, the operations are explained in the case where the microcomputer 81 has broken down, and has had the breakdown has been detected by the breakdown detector 201.

When the breakdown detector 201 has detected the breakdown, the output OUT thereof becomes "I". Since this signal is applied to the input M of the means 208 for invalidating the microcomputer outputs, the signals of the inputs I21 and I22 connected with the outputs PBO, 1 of the microcomputer 82 are delivered from the AND gates 152 and are passed through the OR gates 153 into the outputs 01 and 02. By the way, even when the microcomputer 81 operates erroneously and delivers the output signals of "1's", the outputs of the AND gates 151 become the same as those of the AND gates 152 subject to the correct signals of the microcomputer E2, and hence, the escalator can be run without any hindrance.

Owing to the above operations, even when the microcomputer 81 has broken down, the escalator is run without being stopped, and passengers can accordingly be conveyed safely.

The reason why, as stated above, the inputs signals can be immediately changed-over to continue the operation of the escalator, is that the inputs are connected in quite the same manner and that the same programs are executed in accordance with the input signals. Also, since the signals are ones for starting and stopping the escalator, the signals do not undergo changes due to the repetition of the start and stop in several tens milliseconds, so when the signals are changed, they do not cause any contradictions in the operation of the escalator.

After the input signals have been changed-over as described above, the microcomputer 81 is recovered by the recovery means of the microcomputer 82 in the same manner as in the foregoing embodiment. Then, the first program of the microcomputer 81 executes the processing of receiving signals indicative of the present operating states of the escalator from the microcomputer 82 through the communication line 86 and setting the values of these signals at the outputs PBO, 1 so as to continue the subsequent operation on the basis of the set values.

That is, when the resetting output to reset is produced, the output OUT of the breakdown detector 201 becomes "O", so that the input M of the microcomputer output invalidation means 208 becomes Ill again, to validate the AND gates 151 and to being the outputs of both the microcomputers 81 and 82 into agreement, whereby the operation of the escalator is continuously controlled as before.

Similarly to the foregoing embodiment, when the breakdown is not corrected immediately, an output signal is delivered from the output PBC of the microcomputer 82 to the use inhibiting means 111, thereby presenting users from getting on the escalator.

Meanwhile, when the microcomputer 82 has broken down, the comparison means 206 is not affected by the resulting signal, and hence, the breakdown is controlled irrespective of the operation of the escalator. Besides, as in the foregoing embodiment that, when the microcomputer 82 does not operate despite the recovery means, an output signal is delivered from the output PB7 of the microcomputer 81 to the use inhibiting means 111, thereby cautioning the users not to enter the escalator.

Further, as in the foregoing embodiment t, when both the microcomputers have broken down, this situation is detected by the gate 227; the output signal is applied to the input STOP of the drive means 103, thereby to cut off the power from the drive means and to stop the escalator. Therefore, the escalator is not run under no control as when both microcomputers do not operate.

In the case of the actuation of any safety device, even when either the microcomputer 81 or the microcomputer 82 detects the actuation, and the other microcomputer fail to detect failing in the detection, for example, when the level converter 73 or 75 has developed trouble, the comparison means 206 compares the inputs from the microcomputers and finds the disagreement between the microcomputers, so that the escalator can be stopped reliably. Accordingly, the escalator is operated only while both the microcomputers 81, 82 judge the safety devices as being normal.

On this occasion, if the communication line 86 is laid, the information of the detected result can be sent through this communication line, whereby the escalator can be stopped more reliably.

In addition, when the microcomputer 82 has detected the actuation of any of the manual reset type safety devices, or when it is notified of the actuation detection through the communication line 86 by the microcomputer 81 as described above, it controls the telephonic interface 105 so as to communicate the actuation to the centralized monitoring office 109.

Besides, when the microcomputer 82 communicates the detection of the breakdown of the microcomputer 81 by the breakdown detector 201 upon knowing it, there are the effects that reduce the electrical noise imposed on the microcomputer that can be implemented beforehand, and that, if the microcomputer is not remedial from the breakdown, the situation can be coped with promptly. Further, when the communication is performed subject to the disagreement of the detected result of the actuation of any safety device as checked through the communication line 86 by the microcomputer 81, the trouble with the level converter 73 or 75 can be quickly eliminated.

As thus far described, according to the several embodiments of the present invention, the following effects can be achieved:

(1) The signals of various safety devices are input to at least two microcomputers so as to detect the actuation of any safety device, and output storage means is further disposed. Therefore, the operation of an escalator is not stopped due to the breakdown of the microcomputer, so that a shock attributable to the stop is not imparted to passengers.

(2) Since the control of communication to a centralized monitoring office is allotted to one of at least two microcomputers, any microcomputer for receiving the signals of the safety devices need not be especially designated.

(3) Since the detected result of the actuation of any safety device is output as a running permissive signal, another microcomputer also can be employed also for the detection of the actuation.

(4) When all of the breakdown detectors of the microcomputers for detecting the actuation of any safety device have detected the breakdowns of all the microcomputers, the escalator is immediately stopped, so that the safety of passengers can be secured against the breakdowns of the microcomputers.

(5) Upon the actuation of any of manual reset type safety devices, the actuation is communicated to a centralized monitoring office, so that a repair person need not rush for maintenance in response to a wasteful communication.

(6) The detection of the actuation of any safety device and the control of an escalator are performed by two microcomputers, and the communication of a message is transmitted when the outputs of the two microcomputers disagree, so that the trouble of an apparatus can be remedied quickly and reliably.

(7) When the breakdown of a microcomputer has been detected, it is communicated, so that it can be remedied reliably.

(8) A microcomputer receiving the signals of safety devices is furnished with a breakdown detector, and when the operation has had the breakdown thereof detected, it is recovered from the breakdown by means for recovery from the breakdown by another microcomputer. Therefore, the microcomputer having broken down can be immediately recovered, and any dangerous situation can be avoided quickly.

(9) In a case where a microcomputer does not recover despite the means for recover from the breakdown thereof,an apportion for inhibiting users from using the escalator is indicated. Therefore, the users are inhibited from getting on the escalator after a dangerous situation caused by the actuation of any safety device is detected by a single microcomputer, so that the safety of the users can be maintained.

(10) In stopping an escalator a brake gear is operated, so that the escalator can be stopped reliably.

As set forth above, according to the present invention, when any of the various safety devices of a passenger conveyor (escalator) has been actuated, the passenger conveyor can be stopped reliably, and the actuated safety device can be identified. It is also possible that, even when a digital electronic computer (microcomputer) for detecting the actuation has broken down, the escalator is run continuously without being stopped. Further, even during the breakdown of one microcomputer, the escalator can be reliably stopped in accordance with the actuation of any safety device.

In addition, when the safety device has been actuated, the actuation can be reliably communicated.

We claim:

1. A passenger conveyor control apparatus for controlling a passenger conveyor, comprising:

an endless belt;

means for driving said endless belt;

safety device means for detecting abnormal operation with respect to an operation of said passenger conveyor;

a first digital computer for generating a start-instruction signal to operate said endless belt, said first digital computer being coupled to an output of said safety device means to thereby generate a stop-instruction signal for said endless belt upon detecting abnormal-operation signals from said safety device means;

a second digital computer coupled to said output of said safety device means for generating a stop-instruction signal for said endless belt upon detecting abnormal-operation signals from said safety device means;

output supply means for storing an output signal from said first digital computer and for using said first digital computer output signal as an operation signal to perform a running control of said driving means;

means for preventing said first digital computer output signal from being output to said output supply means when said first digital computer breaks down;

means for resetting said operation signal stored in said output supply means to stop said driving means when one of said first and second digital computers detects abnormal-operation signals from said safety device means;

means for invalidating an output of either of said first digital computer and said second digital computer when either of said first and second digital computers breaks down; and means for controlling said driving means and stopping said driving means from driving said endless belt in response to said operation signal of said output supply means.

2. A passenger conveyor control apparatus as in claim 1, wherein said first digital computer and said second digital computer generate either of a permissive signal and a non-permissive signal for maintaining a running control of said driving means in response to a detection of abnormal-operation signals from said safety device.

3. A passenger conveyor control apparatus as in claim 1, wherein any of said at least two digital computers includes means for reporting the detection of the abnormal-operation signals from said safety device.

4. A passenger conveyor control apparatus as in claim 1, wherein said safety device means comprise a manual reset type device and an automatic reset type device, said safety device means being connected to said digital computers in parallel, and wherein said first and second digital computers comprise means for stopping said driving means after abnormal-operation signals are detected from said safety device means, and at least one of said first digital computer and said second digital computer comprises means for reporting said detection of abnormal-operation signals detected by said manual reset type safety device.

5. A passenger conveyor control apparatus as in claim 1, wherein said first and second digital computers both include means for storing said detected abnormal-operation signals from said safety device means.

6. A passenger conveyor control apparatus as in claim 1, wherein said first and second digital computers both further comprise means for detecting a breakdown of the other of said first and second digital computers, and means for invalidating the stopping of said driving means after said breakdown has been detected by said breakdown detection means.

7. A passenger conveyor apparatus as in claim 1, wherein both of said first and second digital computers comprise same programs to process output signals from said safety device means.

8. A passenger conveyor control apparatus as in claim 1, further comprising means for generating a signal to stop said operation of said endless belt when said first and second digital computers break down.

9. A passenger conveyor control apparatus for controlling a passenger conveyor, comprising:

an endless belt;

means for driving said endless belt;

safety device means for detecting abnormalities with respect to operation of said passenger conveyor;

a first digital computer for generating a start-instruction signal to operate said endless belt, said first digital computer being coupled to an output of said safety device means to thereby generate a stop-instruction signal for said endless belt upon detecting abnormal-operation signals from said safety device means;

a second digital computer coupled to said output of said safety device means for generating a stop-instruction signal for said endless belt upon detecting abnormal-operation signals from said safety device means, said second digital computer having means for reporting said detection of abnormal-operation signals from said safety device means;

means for stopping said driving means upon said detection, by either of said first digital computer and said second digital computer, of abnormal-operation signals from said safety device means;

means for detecting a breakdown of either of said first and second digital computers;

means for suppressing said stopping of said driving means after breakdown has been detected in either of said first digital computer and said second digital computer by said breakdown detecting means;

recovery means for either of said first digital computer and said second digital computer restarting the other of said first digital computer and said second digital computer having a breakdown detected by said breakdown detection means;

means for controlling said driving means in response to output signals from at least one of said first and second digital computers and stopping said driving means from driving said endless belt.

10. A passenger conveyor control apparatus as in claim 9, wherein said first digital computer and said second digital computer input a signal for starting said driving means, and wherein said passenger conveyor control apparatus further comprises:

an output supply means comprising means for storing output signals of said first and second digital computers for performing a running control of said driving means;

means for invalidating said storage of said output signals after breakdown of either of said first digital computer or said second digital computer has been detected by said breakdown detecting means;

and means for resuming operation of said driving means after said breakdown in either of said first or second digital computer has been detected by said breakdown detecting means and restarting said one of said first and second digital computers having a breakdown detected to continue running control of said driving means with said output signals stored by said storage means, by executing function of said one of said first and second memory having a breakdown detected.

11. A passenger conveyor apparatus as in claim 9, wherein said first and second digital computers comprise same programs to process output signals from said safety device means.

12. A passenger conveyor control apparatus comprises:

a passenger conveyor having an endless belt;

a drive means to drive said endless belt;

safety devices for detecting operating conditions of said passenger conveyor and for outputting operation signals to control said passenger conveyor under abnormal conditions;

a first digital computer for generating a signal to operate said endless belt in response to a start instruction, said first digital computer being coupled to an output of a safety device to thereby generate a stop-instruction signal for said endless belt upon said safety device detecting an abnormal-operation of said passenger conveyor;

a second digital computer coupled to a safety device for generating a stop-instruction signal for said endless belt upon detecting an abnormal-operation of said passenger conveyor, said first and second digital computers being connected in parallel to said safety devices;

a control apparatus coupled to both of said first and second digital computers to detect an activation of any of said safety devices;

means for supplying said drive means with an output indicative of an activation of any of said safety devices, said output being received from either of said first and second digital computers;

means for detecting a breakdown of either of said first and second digital computers;

means for stopping said driving means in response to a detection of a breakdown in either of said first and second digital computers;

means for suppressing said stopping of said driving means by said one of said first and second digital computers having said breakdown detected by said breakdown detecting means; and means for inhibiting use of said passenger conveyor after said breakdown of said one of said first and second digital computers and said one digital computer does not recover from said breakdown and said breakdown means detects a breakdown of the other of said first and second digital computers.

13. A passenger conveyor control apparatus as in claim 12, wherein said means for inhibiting use of said passenger conveyor sounds an alarm buzzer and stops said passenger conveyor after a predetermined time period.

14. A passenger conveyor control apparatus as in claim 12, wherein said means for inhibiting use of said passenger conveyor inhibits any user from entering into said passenger conveyor.

15. A passenger conveyor control apparatus as in claim 12, wherein said first and second digital computers comprise same programs to process output signals from said safety device.

16. A passenger conveyor apparatus comprising:

safety devices for detecting operation conditions of said passenger conveyor and generating an activation signal after an abnormal operation condition is detected;

an endless belt;

a driving machine for driving said endless belt;

a digital electronic computer to control said driving machine;

a control apparatus for said passenger conveyor, comprising a digital electronic computer for receiving said safety device activation signals in parallel for detecting activation signals from any of said safety devices, and for outputting activation operation signals corresponding to said safety device activation signals; and means for stopping said driving machine when said activation operation signals output by said electronic computer indicates the abnormal operation condition.

17. A passenger conveyor control apparatus as in claim 16, wherein said passenger conveyor control apparatus further comprises means for reporting to a remote location when said activation operation signals of said electronic computer indicates the abnormal operation condition.

* * * * *